United States Patent
Homma

(10) Patent No.: US 8,539,503 B2
(45) Date of Patent: Sep. 17, 2013

(54) APPARATUS FOR DISPLAYING A MULTI-WINDOW SYSTEM HAVING AN ACTIVE APPLICATION AND AN INACTIVE APPLICATION

(75) Inventor: Akitugu Homma, Tokyo (JP)

(73) Assignee: Fujitsu Mobile Communications Limited, Kawasaki (JP)

( * ) Notice: Subject to any disclaimer, the term of this patent is extended or adjusted under 35 U.S.C. 154(b) by 1068 days.

(21) Appl. No.: 12/409,719

(22) Filed: Mar. 24, 2009

(65) Prior Publication Data

US 2009/0276788 A1 Nov. 5, 2009

(30) Foreign Application Priority Data

Apr. 30, 2008 (JP) ................. P2008-118939

(51) Int. Cl.
  G06F 1/32 (2006.01)
  G06F 1/00 (2006.01)
  G06F 9/46 (2006.01)
  G06F 15/177 (2006.01)

(52) U.S. Cl.
  USPC .......... 718/107; 718/104; 718/100; 718/103; 713/320; 713/300; 709/103; 709/226; 709/219

(58) Field of Classification Search
  USPC ................. 709/103, 226, 219, 220; 715/859, 715/807; 707/10; 718/104, 100, 103; 725/151; 348/565; 713/320, 300; 345/581
  See application file for complete search history.

(56) References Cited

U.S. PATENT DOCUMENTS

| 6,005,575 A * | 12/1999 | Colleran et al. | 715/807 |
| 6,091,414 A * | 7/2000 | Kraft et al. | 715/807 |
| 6,212,541 B1 * | 4/2001 | McAuliffe et al. | 718/100 |
| 7,053,956 B2 * | 5/2006 | Amendolagine et al. | 348/565 |
| 7,058,947 B1 * | 6/2006 | Raja et al. | 718/104 |
| 7,802,256 B2 * | 9/2010 | Havens | 718/103 |
| 7,991,890 B2 * | 8/2011 | Schmidt et al. | 709/226 |
| 2003/0009506 A1 * | 1/2003 | Bril et al. | 709/103 |

(Continued)

FOREIGN PATENT DOCUMENTS

| JP | 05-265974 A | 10/1993 |
| JP | 2004-061342 A | 2/2004 |
| JP | 2005-252969 A | 9/2005 |
| JP | 2006-101405 A | 4/2006 |

OTHER PUBLICATIONS

NPL, Transport Stream 2006-2007, pp. 1-7.*

(Continued)

Primary Examiner — Thomas Lee
Assistant Examiner — Aurel Prifti
(74) Attorney, Agent, or Firm — Maschoff Brennan

(57) ABSTRACT

In an information processing apparatus according to the present invention, a control unit notifies each application program of a key input event in a multi-window system. If the state of a first application program is inactive, the control unit determines whether or not the event notified to the first application program is a key input event caused by a key other than an active switching key. If it is determined that the event is a key input event caused by a key other than the active switching key, the control unit causes a clock circuit to time a predetermined time period, and performs control so as to omit part of processing by the first application program, or to provide a predetermined wait time in between the processing by the first application program, until the predetermined time period is timed out.

15 Claims, 21 Drawing Sheets

(56) References Cited

U.S. PATENT DOCUMENTS

| | | | |
|---|---|---|---|
| 2004/0030943 A1* | 2/2004 | Ishidera et al. | 713/320 |
| 2004/0194153 A1* | 9/2004 | Garg et al. | 725/151 |
| 2005/0160302 A1* | 7/2005 | Asakura et al. | 713/320 |
| 2005/0289360 A1* | 12/2005 | Banginwar et al. | 713/300 |
| 2006/0031781 A1* | 2/2006 | Keohane et al. | 715/807 |
| 2006/0053113 A1* | 3/2006 | Hentschel | 707/10 |
| 2006/0101293 A1* | 5/2006 | Chandley et al. | 713/300 |
| 2006/0123115 A1* | 6/2006 | Satomi | 709/226 |
| 2006/0212546 A1* | 9/2006 | Kishimoto | 709/219 |
| 2006/0279579 A1* | 12/2006 | Miyoshi | 345/581 |
| 2007/0143713 A1* | 6/2007 | Hosoki et al. | 715/859 |
| 2007/0266123 A1* | 11/2007 | Johannesson et al. | 709/220 |

OTHER PUBLICATIONS

JP Office Action mailed on May 15, 2012 as received in application No. 2008-118939.

* cited by examiner

APPARATUS FOR DISPLAYING A MULTI-WINDOW SYSTEM HAVING AN ACTIVE APPLICATION AND AN INACTIVE APPLICATION

BACKGROUND OF THE INVENTION

1. Field of the Invention

The present invention relates to an information processing apparatus. Specifically, the present invention relates to an information processing apparatus such as a cellular phone which can simultaneously display a plurality of windows by a multi-window system.

2. Description of the Related Art

In recent years, cellular phones as information processing apparatuses are increasingly equipped with not just a communication function via a telephone call but also such functions as an address book function, an e-mail function via a network such as a base station or the Internet, a browser function allowing browsing of Web pages or the like, and further a music control function allowing listening of audio data, and a function allowing reception of terrestrial digital one-segment broadcast waves. Also, it is becoming increasingly possible to reproduce received images based on terrestrial digital one-segment broadcast waves, or various video contents acquired by other means, on cellular phones.

Recently, cellular phones equipped with a multi-window system are also proposed. This multi-window system represents a method of implementing window applications by placing display parts on a plurality of windows. In cellular phones equipped with a multi-window system, a plurality of window applications run simultaneously on the screen, and a plurality of windows are displayed simultaneously.

Examples of application programs (window applications) using windows on the screen include application programs related to reproduction of moving images (that is, video reproduction application programs), and application programs related to transmitting/receiving and generation of e-mails. As an example of techniques related to reproduction of moving images, a technique is known in which if performing a decoding process on a moving image that places a high processing load, upon detecting that the processing load involved (for example, the processor usage, the memory usage, or the like) is high, part of the decoding process on the moving image is omitted (see, for example, Japanese Unexamined Patent Application Publication No. 2006-101405).

According to the technique disclosed in Japanese Unexamined Patent Application Publication No. 2006-101405, the video reproduction application program detects the current load on the computer, and if the current load on the computer is not high, the video reproduction application program executes a normal decoding process in which all encoded screens are decoded, and if the current load on the computer becomes high, the video reproduction application program executes a decoding process that omits decoding of unreferenced screens which are not referenced from other screens. This allows decoding of a moving image to be executed smoothly.

Consider a case where, in the multi-window system in which a plurality of window applications run simultaneously on the screen, and a plurality of windows are displayed simultaneously, an application program that places a high load on the CPU, for example, an application program related to reproduction of moving images, exists among the window applications that are running. In this case, upon attempting to execute another application program simultaneously with processing by this application program related to reproduction of moving images, even if a command is input to the cellular phone when an input unit is operated by the user, it takes some time until the command is accepted by the other application, which not only detracts from the responsiveness of the cellular phone but also detracts from the ease of use for the user.

Of course, if the technique disclosed in Japanese Unexamined Patent Application Publication No. 2006-101405 is used, when the current load on the computer becomes high, a decoding process that omits decoding of unreferenced screens which are not referenced from other screens can be executed, and this would make it possible to execute decoding of a moving image smoothly. However, since part of the decoding process on a moving image is omitted in all cases regardless of whether the user is looking at the moving image or not, even when the user is looking at the moving image, part of the decoding process on the moving image is omitted against the user's will, resulting in loss of smoothness of motion upon reproducing the moving image.

SUMMARY OF THE INVENTION

The present invention has been made in view of the above-mentioned circumstances. Accordingly, it is an object of the present invention to provide an information processing apparatus such as a cellular phone that allows high-load processing by an inactive application to be executed while maintaining the responsiveness of a window application that is active, in a case when a plurality of window applications are running in a multi-window system.

To solve the above-mentioned problems, according to the present invention, there is provided an information processing apparatus for a multi-window system in which at least a first application program and a second application program run simultaneously, the first application program and the second application program having an active state and an inactive state, comprising: an event notifying unit configured to notify each application program of an event related to input; an activate unit configured to activate one of the application program and deactivate the other application program; a determining unit configured to determine whether or not an input is made to an application program that is in active state; a timing unit configured to time a predetermined time, if it is determined by the determining unit that an input is made to the an application program that is in active state; and a control unit configured to control so as to omit part of processing related to the application program that is in inactive state, until the predetermined time period is timed out by the timing unit. To solve the above-mentioned problems, according to the present invention, there is provided an information processing apparatus for a multi-window system in which at least a first application program and a second application program run simultaneously, the first application program and the second application program having an active state and an inactive state, comprising: an event notifying unit configured to notify each application program of an event related to input; an activate unit configured to activate one of the application program and deactivate the other application program; a determining unit configured to determine whether or not an input is made to an application program that is in active state; a timing unit configured to time a predetermined time, if it is determined by the determining unit that an input is made to the an application program that is in active state; and a control unit configured to control so as to provide a predetermined wait time in between the processing related to the application program that is in inactive state, until the predetermined time period is timed out by the timing unit.

DESCRIPTION OF THE PREFERRED EMBODIMENTS

An embodiment of the present invention will now be described with reference to the drawings.

Figure 1:
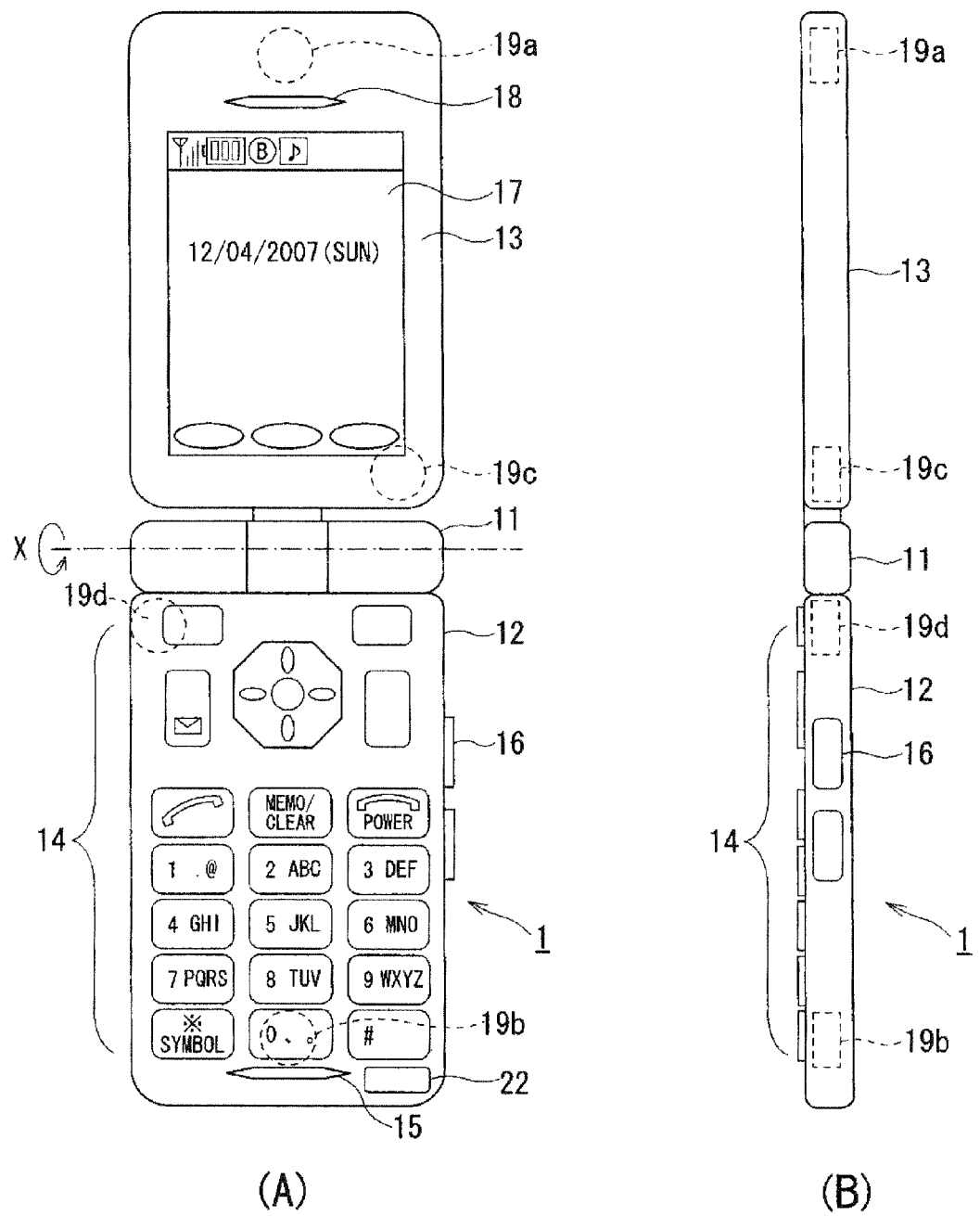
FIGS. 1A and 1B are views showing the exterior configuration of a cellular phone that can be applied to an information processing apparatus according to the present invention.

FIGS. 1A and 1B show the exterior configuration of a cellular phone 1 that can be applied to an information processing apparatus according to the present invention. FIG. 1A shows the exterior configuration of the cellular phone 1 when flipped open to approximately 180 degrees, as seen from the front. FIG. 1B shows the exterior configuration of the cellular phone 1 when flipped open, as seen from the side.

As shown in FIGS. 1A and 1B, the cellular phone 1 has a first casing 12 and a second casing 13 that are hinge-connected to each other with a hinge part 11 in the middle. The cellular phone 1 is formed so as to be foldable in an arrow X direction via the hinge part 11. A transmitting/receiving antenna (an antenna 31 in FIG. 2 described later) is provided at a predetermined position inside the cellular phone 1. The cellular phone 1 may transmit/receive radio waves with a base station via the built-in antenna.

The first casing 12 has on its surface an operating key 14, including alphanumeric keys "0" to "9", a outgoing call key, a redial key, a power key, a clear key, and an e-mail key. Various instructions can be input by using the operating key 14.

The first casing 12 has a cross key and an enter key that are provided in an upper portion as the operating key 14. The cursor being pointed can be moved up, down, left, and right by the user operating the cross key up, down, left, and right. Specifically, various operations such as scrolling through a telephone directory list or e-mails displayed on a main display 17 provided in the second casing 13, flipping through pages on an easy website, and image feed are executed.

By depressing the enter key, entry of various functions can be confirmed. For example, in the first casing 12, when a desired telephone number is selected in accordance with a user's operation on the cross key from among a plurality of telephone numbers in the telephone directory list displayed on the main display 17, and the enter key is depressed in a direction toward the interior of the first casing 12, entry of the selected telephone number is confirmed and a outgoing call is made to the telephone number.

Further, the first casing 12 has the e-mail key provided next and to the left of the cross key and the enter key. An e-mail transmitting/receiving function can be called upon depressing the e-mail key in a direction toward the interior of the casing 12. A browser key is provided next and to the right of the cross key and the enter key When the browser key is depressed in a direction toward the interior of the casing 12, Web page data can be perused.

The first casing 12 also has a microphone 15 provided below the operating key 14. The voice of the user during a call is collected by the microphone 15. Also, an active switching key 22 is provided next and to the right of the microphone 15. The active switching key 22 allows switching of an active window application in a multi-window system in which a plurality of window applications run simultaneously on the screen and a plurality of windows are displayed simultaneously. Further, the first casing 12 has a side key 16 for operating the cellular phone 1.

A battery pack is inserted to be attached on a back surface side of the first casing 12. When the power key turns ON, electric power is supplied to individual circuit units from the battery pack, effecting activation to a ready-to-operate state.

On the other hand, the second casing 13 has the main display 17 provided on its front side. In addition to the reception state of radio waves, the remaining battery capacity, and the names or telephone numbers of the other call parties and the send history registered in the telephone directory, the main display 17 can also display the contents of an e-mail, an easy website, an image captured by a CCD camera (a CCD camera 20 in FIG. 2 described later), content received from an external content server, and content stored in a memory card (a memory card 46 in FIG. 2 described later). A telephone receiver (earpiece) 18 is provided at a predetermined position above the main display 17, thus allowing the user to make a voice call. A speaker (speaker 50 in FIG. 2) is also provided at a predetermined position of the cellular phone 1 as a voice output unit other than the telephone receiver 18.

Magnetic sensors 19a, 19b, 19c, and 19d for detecting the state of the cellular phone 1 are provided at predetermined positions inside the first casing 12 and the second casing 13. The main display 17 may be, for example, a display includes an organic EL, or a liquid crystal display.

Figure 2:
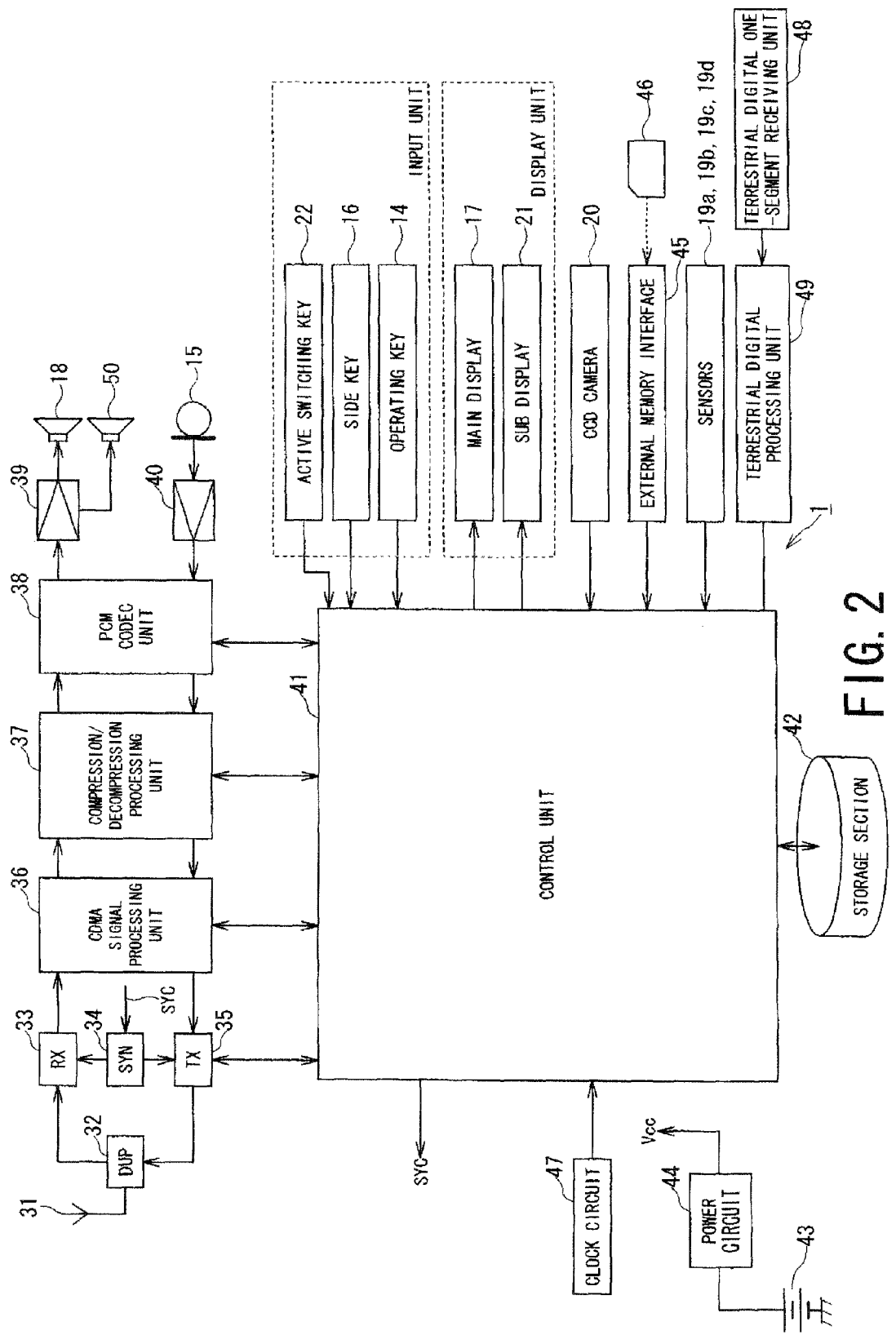
FIG. 2 is a block diagram showing the internal configuration of a cellular phone that can be applied to an information processing apparatus according to the present invention.

FIG. 2 shows the internal configuration of the cellular phone 1 that can be applied to the information processing apparatus according to the present invention. A radio signal transmitted from a base station is received by the antenna 31, and then input to a receiving circuit (RX) 33 via an antenna sharing unit (DUP) 32. The receiving circuit 33 may perform mixing of the received radio signal with a local oscillation signal output from a frequency synthesizer (SYN) 34 to down-convert the received radio signal into an intermediate frequency signal. Then, the receiving circuit 33 generates a reception baseband signal by performing a quadrature demodulation (quadrature detection) on the down-converted intermediate frequency signal. The receiving circuit 33 outputs the generated baseband signal to a CDMA signal processing unit 36 The frequency of the local oscillation signal generated from the frequency synthesizer 34 is indicated by a control signal SYC output from a control unit 41.

The CDMA signal processing unit 36 includes a RAKE receiver. In the RAKE receiver, a plurality of paths included in the reception baseband signal are despread with the respective spread codes (that is, spread codes equivalent to those of the spreading code of the spread received signal). Then, after the phase in the despread signals of the respective paths is adjusted, the despread signals of the respective paths are coherently RAKE-combined by the RAKE receiver. The data series obtained through after this Rake combining is subjected to de-interleaving and channel decoding (error correction decoding), followed by binary data determination. Thus, reception packet data in a predetermined transmission format can be obtained. This reception packet data is input to a compression/decompression processing unit 37.

The compression/decompression processing unit 37 includes a digital signal processor (DSP) or the like. The compression/decompression processing unit 37 separates the reception packet data output from the CDMA signal processing unit 36 in a multiplexer/demultiplexer for each media, and performs a decoding process on each of the data separated for each medium. For example, when in the call mode, speech data corresponding to call voice included in the reception packet data is decoded by a speech codec. Also, if moving image data is included in the reception packet data such as when in, for example, a video-phone mode or the like, this moving image data is decoded by a video codec. Further, if the reception packet data is download content, after this download content is decompressed (expanded), the decompressed download content is output to the control unit 41.

A digital speech signal obtained by the decoding process is supplied to a PCM codec unit 38. The PCM codec unit 38 PCM-decodes the digital speech signal output from the compression/decompression processing unit 37, and outputs a PCM-decoded analog speech data signal to a receiving amplifier 39. After being amplified by the receiving amplifier 39, the analog speech signal is output from the telephone receiver 18.

A digital moving image signal obtained through decoding performed by the compression/decompression processing unit 37 at the video codec is input to the control unit 41. The control unit 41 causes the main display 17 to display a moving image based on the digital moving image signal output from the compression/decompression processing unit 37, via a video RAM such as a VRAM. The control unit 41 can display not only received moving image data but also moving image data captured by the CCD camera 20, on the main display 17 via a video RAM.

If the reception packet data is an e-mail, the compression/decompression processing unit 37 supplies the e-mail to the control unit 41. The control unit 41 causes a storage unit 42 to store the e-mail supplied from the compression/decompression processing unit 37. Then, in accordance with a user's operation on the operating key 14 serving as an input unit, the control unit 41 reads the e-mail stored in the storage unit 42, and causes the main display 13 to display the read e-mail.

On the other hand, when in the call mode, a speech signal (analog speech signal) of a speaker (user) input to the microphone 15 is amplified to an appropriate level by a transmitting amplifier 40 before being PCM-encoded by the PCM codec unit 38. The PCM-encoded digital speech signal is input to the compression/decompression processing unit 37. The moving image signal output from the CCD camera 20 is digitized by the control unit 41 and then input to the compression/decompression processing unit 37. Further, an e-mail as text data generated by the control unit 41 is also input to the compression/decompression processing unit 37.

The compression/decompression processing unit 37 may compression-code the digital speech signal output from the PCM codec unit 38 in a format according to a predetermined transmission data rate. Speech data is thus generated. The compression/decompression processing unit 37 also compression-codes the digital moving image signal output from the control unit 41 to generate moving image data. Then, the compression/decompression processing unit 37 multiplexes and then packetizes the speech data and moving image data in the multiplexer/demultiplexer in accordance with a predetermined transmission format, and outputs the packetized transmission packet data to the CDMA signal processing unit 36. In a case when an e-mail is output from the control unit 41 as well, the compression/decompression processing unit 37 multiplexes this e-mail into the transmission packet data.

The CDMA signal processing unit 36 applies a spread-spectrum process to the transmission packet data output from the compression/decompression processing unit 37 by using a spreading code assigned to the transmission channel. The CDMA signal processing unit 36 then outputs an output signal generated by the spread-spectrum process to a transmitting circuit (TX) 35. The transmitting circuit 35 modulates the signal after the spread-spectrum process by using a digital modulation method such as a QPSK (Quadrature Phase Shift Keying) method. The transmitting circuit 35 synthesizes the digital-modulated transmission signal with the local oscillation signal generated from the frequency synthesizer 34 to up-convert the resulting signal into the radio signal. The transmission circuit 35 amplifies the radio signal generated by this up-converting to a high frequency so as to obtain a transmission power level indicated by the control unit 41. The radio signal thus amplified to a high frequency is supplied to the antenna 31 via the antenna sharing unit 32, and transmitted from the antenna 31 to a base station.

The cellular phone 1 includes an external memory interface 45. The external memory interface 45 includes a slot allowing insertion and removable of a memory card 46. The memory card 46 used is a kind of flash memory card typically represented by a NAND flash memory card and a NOR flash memory card. The memory card 46 allows various kinds of data such as images, speech, and music to be written and read via a 10-pin terminal. Further, the cellular phone 1 has a clock circuit (timer) 47 that measures the current time with accuracy.

The control unit 41 includes a CPU, a ROM and a RAM. The CPU executes various kinds of processing in accordance with programs stored in the ROM or various application programs including the operating system (OS), which are loaded into the RAM from the storage unit 42. Also, the CPU generates various control signals, and supplies the signals to individual units, thereby performing centralized control of the cellular phone 1. The RAM stores data necessary for the CPU to execute various kinds of processing, as appropriate.

The storage unit 42 is includes a flash memory device that is a non-volatile memory that allows data to he rewritten or erased electrically, an HDD, or the like. The storage unit 42 stores various application programs to be executed by the CPU of the control unit 41, and various data sets.

A power circuit 44 generates a predetermined operating power supply voltage Vcc on the basis of the output of a battery 43, and supplies the operating power supply voltage Vcc to each circuit unit. Also, a terrestrial digital one-segment receiving unit 48 receives terrestrial digital one-segment broadcast waves or terrestrial digital radio broadcast waves from a broadcasting station, and generates a TS signal based on the received terrestrial digital one-segment broadcast waves or terrestrial digital radio broadcast waves to be supplied to a terrestrial digital processing unit 49. When terrestrial digital one-segment broadcast waves are received by the terrestrial digital one-segment receiving unit 48, the terrestrial digital processing unit 49 separates the TS signal based on the terrestrial digital one-segment broadcast waves from the terrestrial digital one-segment receiving unit 4 into individual ESs related to audio data and video data. The terrestrial digital processing unit 49 then decodes the separated audio data in a predetermined decoding method by an audio decoder inside the terrestrial digital processing unit 49, and also decodes the separated video data in a predetermined decoding method by a video decoder inside the terrestrial digital processing unit 49. The terrestrial digital processing unit 49 supplies the decoded digital audio signal and decoded digital moving image signal to the control unit 41.

Figure 3:
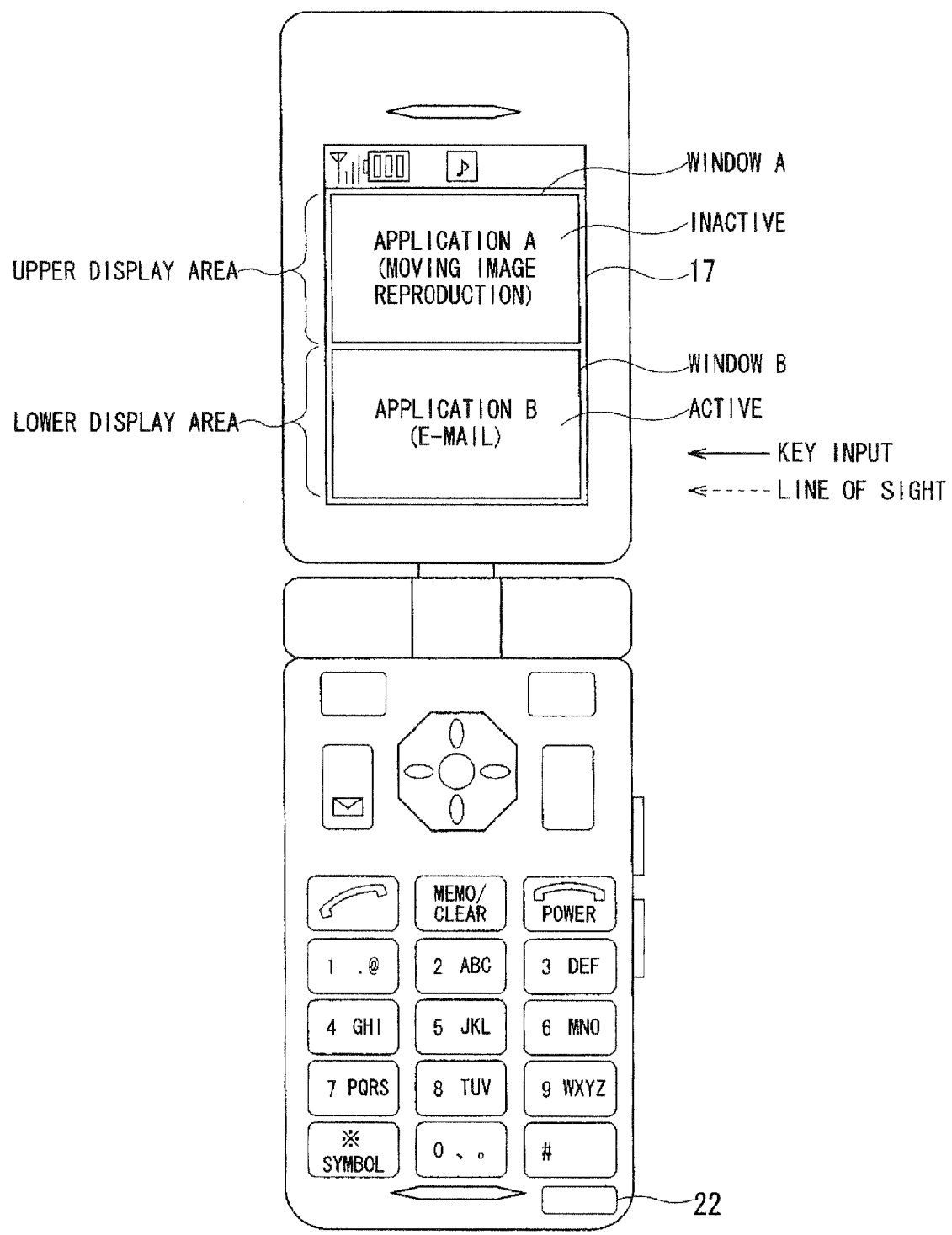
FIG. 3 is an illustrative view illustrating an assumed usage situation in which the user uses a multi-window system with the cellular phone shown in FIG. 2.

Next, referring to FIG. 3, a description will be given of an assumed usage situation in which the user uses the multi-window system with the cellular phone 1 shown in FIG. 2. As shown in FIG. 3, when the user uses the multi-window system with the cellular phone 1 shown in FIG. 2, the screen displayed on the main display 17 is split into two areas and screens related to different applications (application programs) are displayed on the main display 17. In the case of FIG. 3, a screen for an application A that is an application program related to moving image reproduction is displayed in a window A in an upper display area of the main display 17. Also, a screen for an application B that is an application program related to the transmitting/receiving and generation of e-mails is displayed in a window B in a lower display area of the main display 17.

In the case of FIG. 3, the application A executed in the window A in the upper display area of the main display 17 is currently inactive. At this time, even when the operating key 14 or the like of the input unit Is operated by the user, the input is not accepted by the application A. On the other hand, the application B executed in the window B in the lower display area of the main display 17 is currently active. At this time, when the operating key 14 of the input unit is operated by the user, the application B executes processing according to the operating key 14 with which an input has been made. In the case of FIG. 3, since the application B executed in the window B is currently active, and a key input has been made to the application B, it is assumed that the user's line of sight is directed to the application B.

By operating the active switching key 22, the user can switch an application that is currently active on the screen of the main display 17. For example, since the currently active application is the application A in the upper display area, as the active switching key 22 is operated by the user, the active application is switched from the application A to the application B.

A configuration is also possible in which when the user uses the multi-window system, the screen displayed on the main display 17 is split into, for example, three or more areas, and screens related to three or more different applications are displayed on the main display 17. While there must be only one active application at a time, there may be two or more inactive applications at a time.

Figure 4:
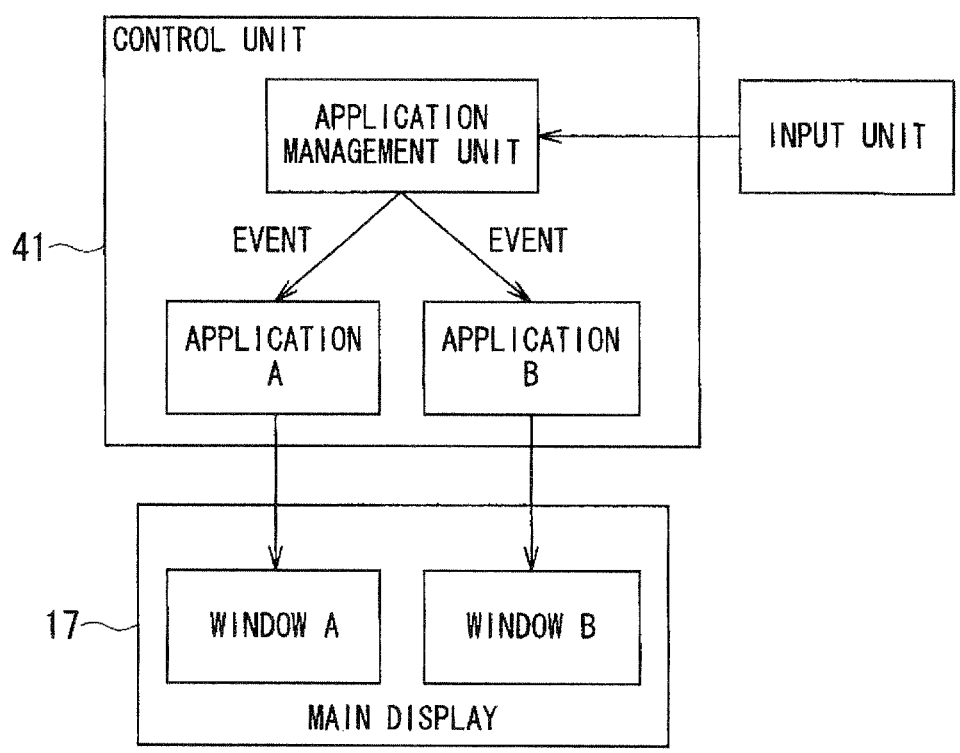
FIG. 4 is a diagram schematically showing a functional configuration that can be executed by a control unit of the cellular phone shown in FIG. 2, in a multi-window system.

FIG. 4 schematically shows a functional configuration that can be executed by the control unit 41 of the cellular phone 1 shown in FIG. 2, in the multi-window system. As shown in FIG. 4, the control unit 41 has an application management unit as a characteristic configuration according to the present invention. The application management unit manages which application is active or inactive among a plurality of applications (window applications) that are currently running in the multi-window system. Also, the control unit 41 notifies individual applications (for example, the application A and the application B that run simultaneously in the multi-window system) of an event, by the application management unit. There are various examples of this event, such as an activate/deactivate event following an operation on the active switching key 22 of the input unit, a key event based on an operation on the operating key 14, and a timer event based on a timer set by the clock circuit 47. The applications perform processing in accordance with the notified event. Then, the processing results of individual applications are displayed in corresponding windows of the main display 17. For example, the processing result of the application A is displayed in the window A, and the processing result of the application B is displayed in the window B.

Figure 5:
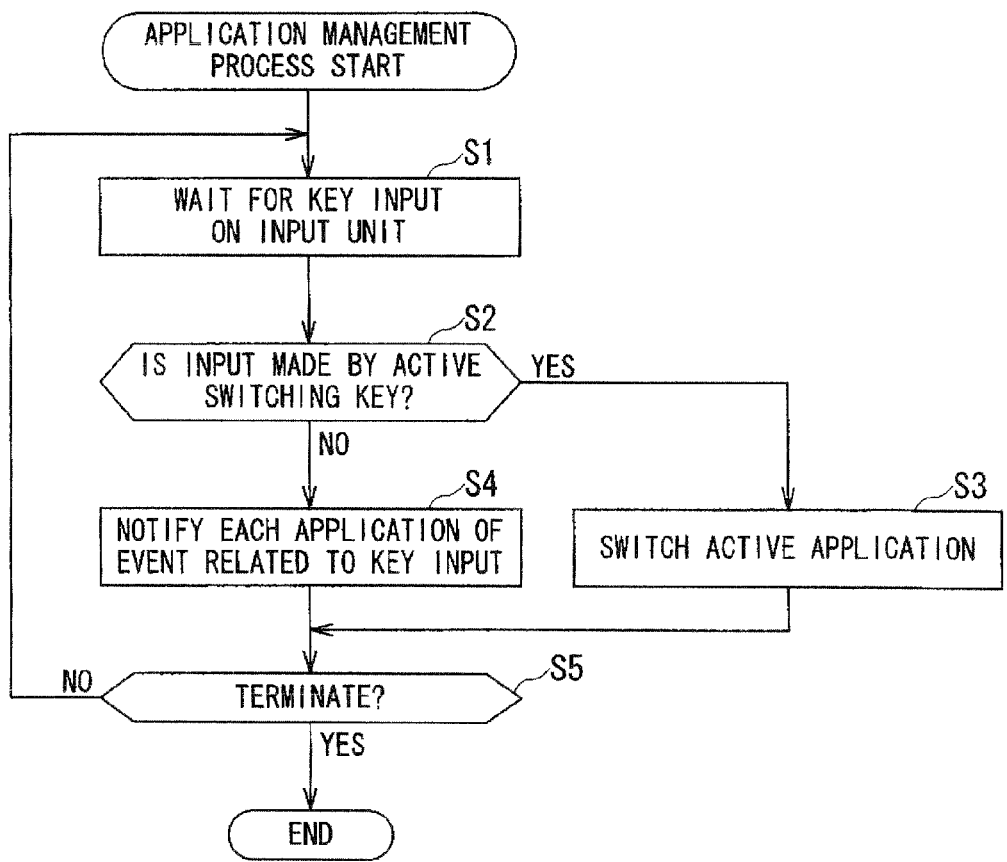
FIG. 5 is a flowchart illustrating an application management process in the cellular phone shown in FIG. 4.

Next, referring to a flowchart in FIG. 5, an application management process in the cellular phone 1 shown in FIG. 4 will be described. This application management process is executed by the application management unit if a plurality of applications are activated, and the plurality of applications are run simultaneously by using the multi-window system. In particular, FIG. 5 illustrates an application management process related to, among various events, an activate/deactivate event following an operation on the active switching key 22 of the input unit, and a key event following an operation on the operating key 14.

In step S1, the control unit 11 executes the application management unit, and accepts a key input on the input unit as the input unit (the operating key 14, the active switching key 22, the side key 16, and the like) is operated by the user. If there is no key input on the input unit, the control unit 41 waits until a key input is made on the input unit.

In step S2, if the control unit 41 executes the application management unit, and accepts a key input on the input unit following a user's operation on the input unit, the control unit 41 identifies the kind of the key input, and determines whether or not the accepted key input is an input made by the active switching key 22. If the control unit 41 determines in step S2 that the key input is an input made by the active switching key 22, in step S3, the control unit 41 executes the application management unit, and switches an active application. Specifically, the control unit 41 notifies the currently active application of a deactivate event for causing transition from an active state to an inactive state, and notifies the currently inactive application (when a plurality of inactive applications exist, one of the inactive applications) of an activate event for causing transition from an inactive state to an active state.

On the other hand, if the control unit 41 determines in step S2 that the key input is not an input made by the active switching key 22, in step S4, the control unit 41 executes the application management unit, and notifies each of applications that are simultaneously running in the multi-window system, of an event related to a key input made by a key other than the active switching key 22 (for example, a key input made by the operating key 14).

In step S5, as an instruction for terminating the application management process is issued, the control unit 41 determines whether or not to terminate the application management process. If the control unit 41 determines in step S5 to terminate the application management process, the application management process is terminated. If the control unit 41 determines in step S5 not to terminate the application management process, the process returns to step S1, and the processes from step S1 onwards are repeatedly executed.

Figure 6:
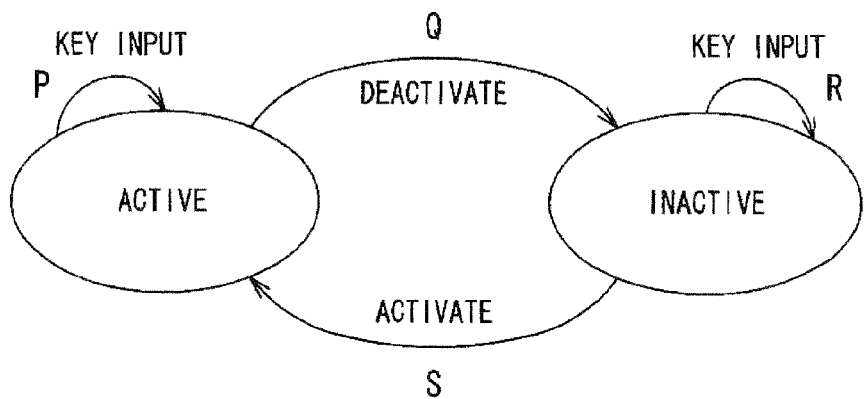
FIG. 6 is a diagram showing state transitions of an application.

FIG. 6 is a state transition diagram showing transition states to which each application can transit, in a case when a plurality of applications are run simultaneously by using the multi-window system. In the case of FIG. 6, the state of an application can transit to an active state and an inactive state As shown in FIG. 6, when the state of an application is active, and a key input event caused by a key other than the active switching key 22 is received, the state of the application remains active with no state transition, as indicated by the arrow P in FIG. 6. Also, when the state of an application is inactive, and a key input event caused by a key other than the active switching key is received, the state of the application remains inactive with no state transition, as indicated by the arrow R in FIG. 6. Further, when the state of an application is active, and a key input event caused by the active switching key 22 (deactivate event) is received, the state of the application transits from an active state to an inactive state in accordance with the received deactivate event, as indicated by the arrow Q in FIG. 6. On the other hand, when the state of an application is inactive, and a key input event caused by the active switching key 22 (activate event) is received, the state of the application transits from an inactive state to an active state in accordance with the received activate event, as indicated by the arrow S in FIG. 6.

Figure 7:
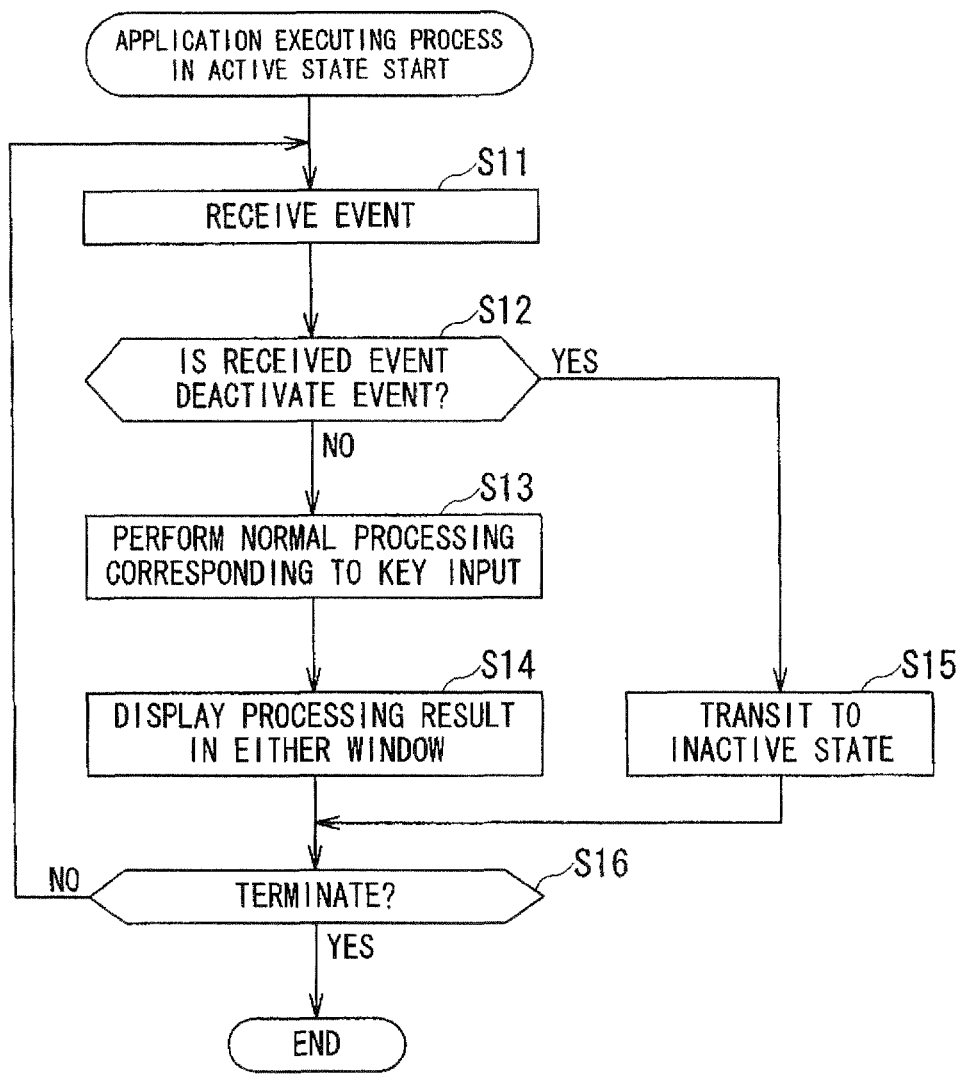
FIG. 7 is a flowchart schematically illustrating an application executing process that is executed if the state of an application is active, in the cellular phone shown in FIG. 4.

Next, referring to a flowchart in FIG. 7, an application executing process in the cellular phone 1 shown in FIG. 4 will be schematically described. This application executing process is executed by each individual application when a plurality of applications are run simultaneously by using the multi-window system. The application executing process described with reference to the flowchart in FIG. 7 is a process that is executed if the state of an application is active. A process executed if the state of an application is inactive will be described later with reference to FIG. 8.

In step S11, the control unit 41 executes applications that are to be ran simultaneously by using the multi-window system (for example, the application A, the application B, and the like shown in FIG. 4). Each of the applications receives various events sequentially notified from the application management unit (for example, an event related to a key input made by a key other than the active switching key 22, an activate event, and a deactivate event).

In step S12, the control unit 41 determines whether or not the received event is a deactivate event caused by the active switching key 22. If the control unit 41 determines in step S12 that the received event is not a deactivate event caused by the active switching key 22 but an event caused by a key (for example, the operating key 14) other than the active switching key 22, in step S13, the control unit 41 applies normal processing to an application corresponding to the key input. The term "normal processing" as used herein means that the processing load is not reduced by omitting some processing or inserting a wait in between processing. In this way, when the state of an application is active, and a key input event caused by a key other than the active switching key is received, the state of the application remains active with no state transition, as indicated by the arrow P in FIG. 6.

In step S14, the control unit 41 controls the main display 17 to display the processing result following the normal processing in step S13, in a window corresponding to the application (in the case of FIG. 4, in the window A if the processing result of the application A is to be displayed). Thereafter, the process proceeds to step S16. In step S16, as an instruction for terminating the application executing process is issued, the control unit 41 determines whether or not to terminate the application executing process. If the control unit 41 determines in step S16 to terminate the application executing process, the application executing process is terminated. If the control unit 41 determines in step S16 not to terminate the application executing process, the process returns to step S11, and the processes from step S11 onwards are repeatedly executed.

On the other hand, if the determining unit 41 determines in step S12 that the received event is a deactivate event caused by the active switching key 22, in step S15, the control unit 41 changes the state of the application from an active state to an inactive state in accordance with the received deactivate event, as indicated by the arrow Q in FIG. 6. Thereafter, the process proceeds to step S16.

Figure 8:
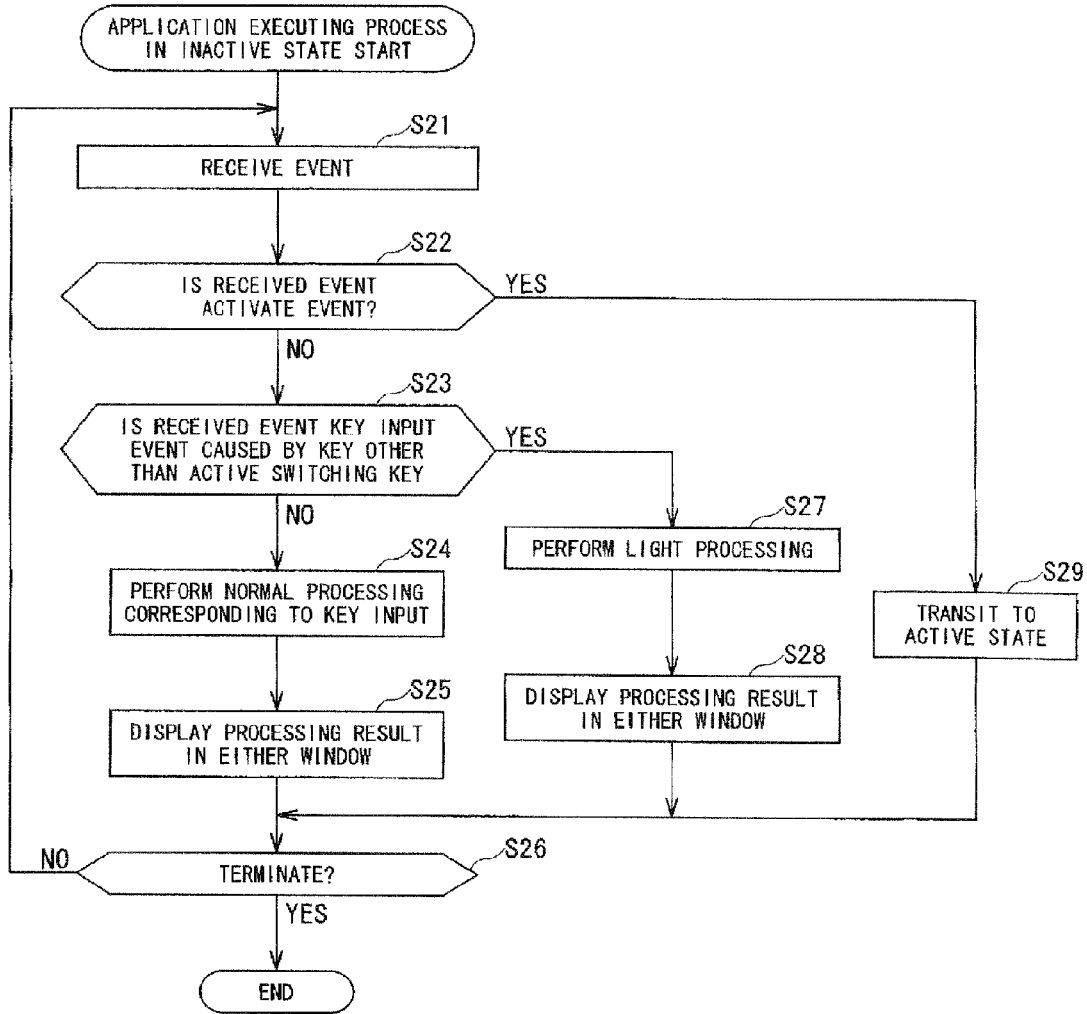
FIG. 8 is a flowchart schematically illustrating an application executing process that is executed if the state of an application is active, in the cellular phone shown in FIG. 4.

Referring to a flowchart in FIG. 8, an application executing process in the cellular phone 1 shown in FIG. 4 will be schematically described. The application executing process described with reference to the flowchart in FIG. 8 is a process that is executed if the state of an application is inactive. The processes of step S21, and steps S24 to S26 in FIG. 8 are the same as the processes of step S11, steps S13 and S14, and step S16 in FIG. 7, and detailed description thereof is omitted.

In step S22, the control unit 41 determines whether or not the received event is an activate event caused by the active switching key 22. If the control unit 41 determines in step S22 that the received event is not an activate event caused by the active switching key 22, since the application is inactive, the control unit 41 recognizes that among kinds of an event received in step S21, an event related to a key input cannot be accepted by this application, and in step S23, the control unit 41 determines whether or not the received event is an event caused by a key other than the active switching key 22 (for example, the operating key 14).

If the control unit 41 determines in step S23 that the received event is not an event caused by a key other than the active switching key 22 (for example, the operating key 14), the process proceeds to step S24. In step S24, the normal processing is executed. Thereafter, the process proceeds to step S25.

On the other hand, if the control unit 41 determines in step S23 that the received event is an event caused by a key other than the active switching key 22 (for example, the operating key 14), the control unit 41 recognizes the received event as being an event with respect to another application that is running simultaneously in the multi-window system. In step S27, the control unit 41 changes the processing method so as to execute this application by lighter processing (processing achieved by, for example, omitting some processing, or inserting a wait in between processing) than the normal processing.

In step S28, the control unit 41 controls the main display 17 to display the processing result following the light processing in step S27, in a window corresponding to the application. In this ways if the state of an application is inactive, and a key input event caused by a key other than the active switching key is received, the state of the application remains inactive with no state transition, as indicated by the arrow R in FIG. 6.

If the control unit 41 determines in step S22 that the received event is an activate event caused by the active switching key 22, in step S29, the control unit 41 executes the application, and changes the state of the application from inactive to active in accordance with the received activate event, as indicated by the arrow S in FIG. 6. Thereafter, the process proceeds to step S26.

Thus, if multiple applications are running in the multi-window system, by making the processing of inactive applications lighter, processing by an active window application can be performed preferentially, thereby making it possible to improve the response speed of the active application.

While the concept and processing according to the present invention have been described above with reference to FIGS. 3 to 8, a specific description will now be given of the application processing according to the present invention described above with reference to FIGS. 7 and 8. In the following description, it is assumed that as shown in, FIG. 3, the application A executed in the window A of the main display 17 is an application program related to moving image reproduction, and the current state of the application A is inactive, whereas the application B executed in the window B of the main display 17 is an application program related to transmitting/receiving and generation of e-mails, and the current state of the application B is active.

Figure 9:
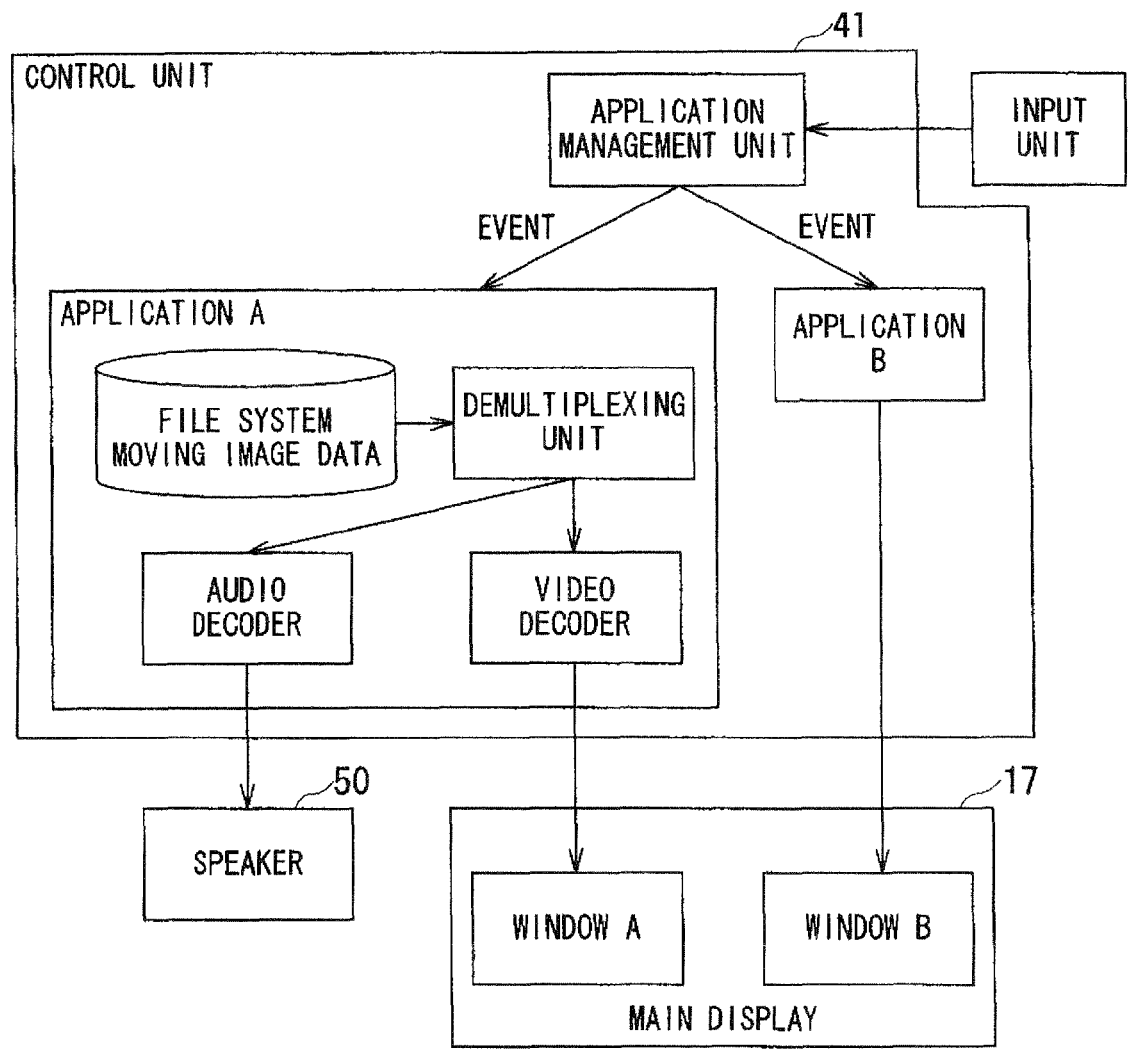
FIG. 9 is a diagram showing in detail a functional configuration that can be executed by a control unit of the cellular phone shown in FIG. 2, in a multi-window system.

FIG. 9 shows in detail a functional configuration that can be executed by the control unit 41 of the cellular phone 1 shown in FIG. 2. A description of configurations corresponding to those in the configuration in FIG. 4 will be omitted to avoid repetition.

The control unit 41 executes the application A that is an application program related to reproduction of moving images, and performs a demultiplexing process, a video decoding process, and an audio decoding process, as software processing. That is, the control unit 41 executes the application A that is an application program related to reproduction of moving images, and separates multiplexed data obtained by multiplexing audio data and moving image data, for each medium (demultiplexing process). Also, the control unit 41 decodes the separated moving image data in a predetermined decoding method (for example, a predetermined encoding method such as the MPEG 4), thus generating a decoded digital moving image signal (video decoding process). While the embodiment of the present invention assumes a case in which audio data and moving image data are stored in advance in the file system of the storage unit 42, the present invention is not limited to this. The present invention can be applied also to a case in which audio data and moving image data are not stored in advance in the storage section 42 (in particular, in the case of, an application related to reception of terrestrial digital broadcast waves using the terrestrial digital one-segment receiving unit 48).

At this time, the control unit 41 decodes the separated audio data in a predetermined decoding method, generating a decoded digital audio signal (audio decoding process). The control unit 41 supplies the digital audio signal obtained by the decoding process to the PCM codec unit 38. The PCM codec unit 38 PCM-decodes the digital audio signal output from the control unit 41, and outputs a PCM-decoded analog audio data signal to the speaker 50. This analog audio signal is amplified before being output from the speaker 50. The decoding process of each of audio data and moving image data that are compression-coded in advance in a predetermined encoding method may be performed as hardware processing.

Then, the control unit 41 stores the generated digital moving image signal into the video RAM of a display drive unit. The drawing of a digital moving image signal into the video RAM is performed for a number of times of drawing per second defined with respect to image content to be reproduced. Then, the display drive unit drives the main display 17, and on the basis of a digital moving image signal stored in the video RAM built in the display drive unit, performs rewriting of the screen displayed in the window A of the main display 17 for a predetermined number of times set in advance per second.

In this regard, in reproduction of a moving image, it is required to perform drawing for a number of times of drawing set in advance per second. In a case where processing that is lighter than the normal moving image reproduction processing is to be performed, part of the processing is omitted. To be more specific, a decoding process of P-frames constituting moving image data is omitted. Thus, CPU resources can be allocated preferentially to the application B other than the application A that is an application program related to reproduction of moving images.

Figure 10:
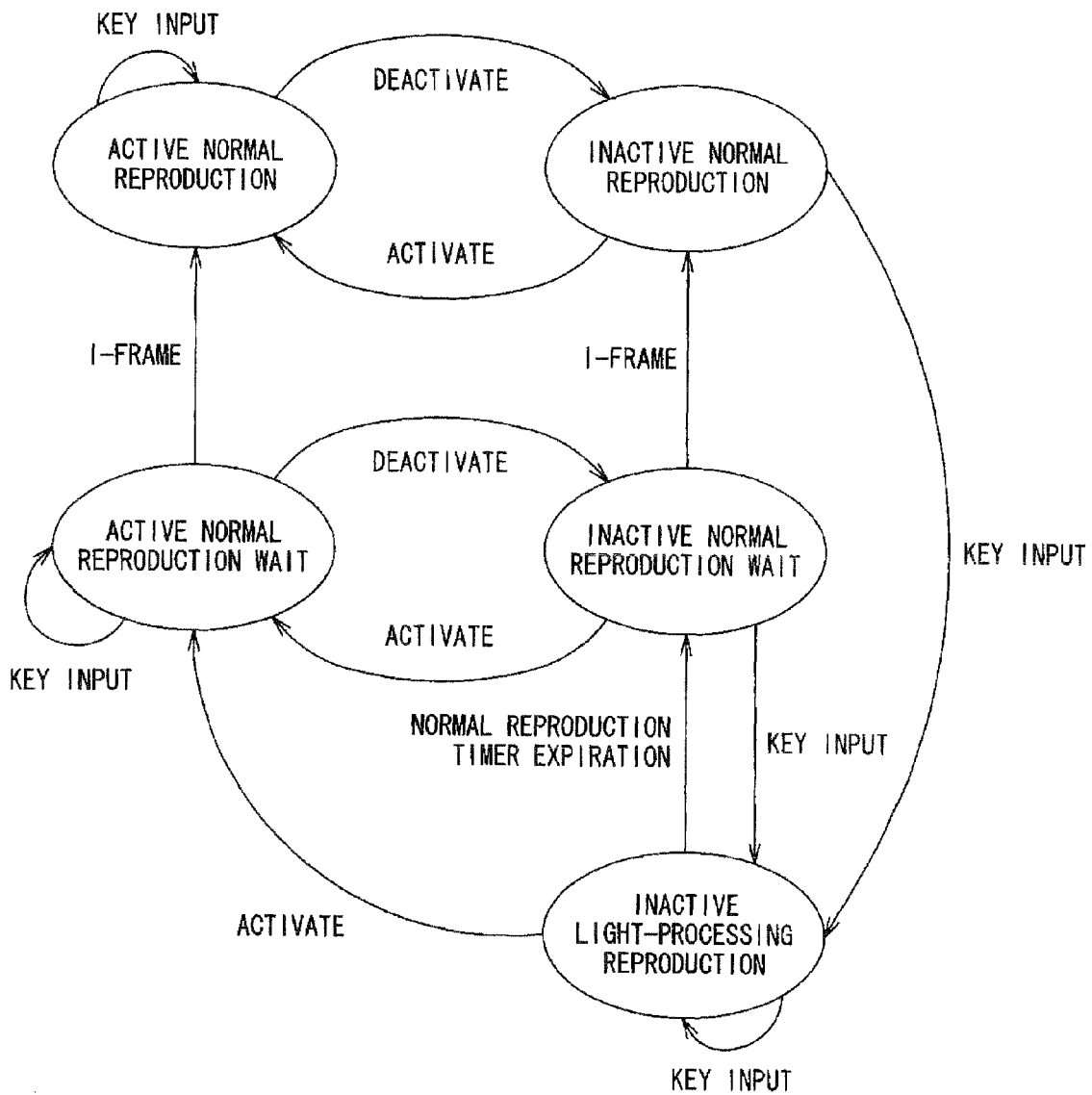
FIG. 10 is a diagram showing state transitions of an application during execution of the application that is an application program related to reproduction of moving images.

FIG. 10 is a state transition diagram of the application A during execution of the application A that is an application program related to reproduction of moving images. In the state transition diagram shown in FIG. 10, the state transition diagram shown in FIG. 6 is divided more finely in accordance with processing executed by the application A. As shown in FIG. 10, there are five states of the application A, that is, active normal reproduction state, inactive normal reproduction state, active normal reproduction wait state, inactive normal reproduction wait state, and inactive light-processing reproduction state.

First, an active normal reproduction state is a state in which the application A is active and a moving image is reproduced normally, and if the operating key 14 or the like of the input unit is operated by the user, the corresponding input is accepted by the application A. At this time, if the application A receives a deactivate event, the state of the application A transits from the active normal reproduction state to an inactive normal reproduction state.

Second, an inactive normal reproduction state is a state in which the application A is inactive, and a moving image is reproduced normally. If the operating key 14 of the input unit is operated by the user in the inactive normal reproduction state, the input is recognized as being not accepted by the application A (that is, the input is recognized as being accepted by the application B), and thereafter, the state of the application A transits from the inactive normal reproduction state to an inactive light-processing reproduction state. Also, if an activate event is received by the application A in the inactive normal reproduction state, the state of the application A transits from the inactive normal reproduction state to the active normal reproduction state.

Third, an inactive light-processing reproduction state represents a state in which the application A is inactive, and among decoding processes of moving image data, only a decoding process of I-frames is performed, and a decoding process of P-frames is omitted, thereby performing moving image reproduction by lighter processing than normal. Upon transition to the inactive light-processing reproduction state, a timer with a predetermined time period is set. At this time, if this timer expires, the state transits to an inactive reproduction wait state. However, if a key input made by a key other than the active switching key 22 is detected again before the timer expires, a timer with a predetermined time period is reset. In this way, by providing a timer for the inactive light-processing reproduction state, if no key input is made for a fixed period of time after a normal key input, the state can return from a state in which a moving image is reproduced by light processing to a state in which a moving image is played back normally.

If the application A receives an activate event in the inactive light-processing reproduction state, the state of the application A transits from the inactive light-processing reproduction state to an active normal reproduction wait state.

Fourth, an inactive normal reproduction wait state represents a state in which the application A is inactive, and after transition from the inactive light-processing reproduction state in which a decoding process of only I-frames is performed, the application A waits until the next I-frame is decoded. That is, since a decoding process of P-frames is suspended in the inactive light-processing reproduction state, it is necessary to wait for the next I-frame in order to transit to the inactive normal reproduction state. Therefore, the application A waits until the next I-frame is decoded. Accordingly, if the next I-frame is decoded, the state of the application A transits from the inactive normal reproduction wait state to the inactive normal reproduction state.

If the application A receives an activate event in the inactive normal reproduction wait state, the state of the application A transits to an active normal reproduction wait state. Also, if a key input by a key other than the active switching key 22 is made in a case where the state of the application A is the inactive normal reproduction wait state, the state transits to the inactive light-processing reproduction state.

Fifth, an active normal reproduction wait state represents a state in which the application A is active, and after transition from the inactive light-processing reproduction in which a decoding process of only I-frames is performed or the inactive normal reproduction wait state, the application A waits until the next I-frame is decoded. Therefore, if the next I-frame is decoded, the state of the application A transits from the active normal reproduction wait state to the active normal reproduction state.

If the application A receives a deactivate event in the active normal reproduction wait state, the state transits to the inactive normal reproduction wait state.

Next, referring to flowcharts in FIGS. 11 to 15, a description will be given in detail of processing executed by the cellular phone 1 shown in FIG. 9 if a key input event is received in each of the states shown in the state transition diagram of the application A (application program related to reproduction of moving images) in FIG. 10.

Referring to a flowchart in FIG. 11, a detailed description will be given of an application executing process in the active normal reproduction state in the cellular phone 1 shown in FIG. 9. During the application executing process in the active normal reproduction state, the application A is active. Thus, if the operating key 14 of the input unit is operated by the user, the control unit 41 recognizes the input as being accepted by the application A.

In step S51, the control unit 41 executes the application A (application program related to reproduction of moving images) that is to be run simultaneously by using the multi-window system, and various events sequentially notified from the application management unit (for example, an event related to a key input made by a key other than the active switching key 22, an activate event, a deactivate event, and a decode event) are received by the application A.

The application A is activated if the operating key 14 is operated by the user, and a decoding process is started. If a decode event is notified to the application A from the application management unit once, the control unit 41 executes the application A, and sets a decode timer for prompting the next decoding process by using the clock circuit 47. Then, upon expiration of the decode timer set by the application A, the application A executed by the control unit 41 notifies the application A itself of a new decode event. Thus, every time a decode timer expires, a decode event is notified to the application A.

In step S52, the control unit 41 determines whether or not the event received by the application A is a deactivate event. If the control unit 41 determines in step S52 that the event received by the application A is not a deactivate event, in step S53, the control unit 41 determines whether or not the event received by the application A is a decode event. If the control unit 41 determines in step S53 that the event received by the application A is a decode event, in step S54, the control unit 41 reads multiplexed data into the RAM of the control unit 41, and separates the multiplexed data into audio data and moving image data. In step S55, the control unit 41 decodes the separated moving image data in a predetermined decoding scheme, and generates a decoded digital moving image signal.

At this time, in parallel with the decoding process of the moving image data, the control unit 41 decodes the separated audio data in a predetermined decoding scheme, and generates a decoded digital audio signal. The control unit 41 supplies the digital audio signal obtained by the decoding process to the PCM codec unit 38. The PCM codec unit 38 PCM-decodes the digital audio signal output from the control unit 41, and outputs a PCM-decoded analog audio data signal to the speaker 50. This analog audio signal is amplified before being output from the speaker 50.

In step S56, the control unit 41 executes the application A, and sets a decode timer for prompting the next decoding process by using the clock circuit 47. In step S57, the control unit 41 controls the main display 17 to display the decoded moving image on the main display 17. The main display 17 displays the decoded moving image in accordance with control of the control unit 41. That is, the control unit 41 stores the generated digital moving image signal into the video RAM of the display drive unit. Then, the display drive unit drives the main display 17, and rewrites the screen displayed in the window A of the main display 17, on the basis of the digital moving image signal stored in the video RAM built in the display drive unit.

Thereafter, the process proceeds to step S58. In step S58, as an instruction for terminating the application executing process is issued, the control unit 41 determines whether or not to terminate the application executing process. If the control unit 41 determines in step S58 to terminate the application executing process, the application executing process is terminated. If the control unit 41 determines in step S58 not to terminate the application executing process, the process returns to step S1, and the processes from step S51 onwards are repeatedly executed. Thus, in a case when the application executing process is not terminated, and the current state of the application A remains the active normal reproduction state, normal moving image reproduction at the time of active normal reproduction indicated by steps S54 to S57 in FIG. 11 is repeatedly executed with respect to the window A every time a decode event is received from the application management unit, until a deactivate event is received from the application management unit.

If the control unit 41 determines in step S53 that the event received by the application A is not a decode event, the decoding process indicated by steps S54 to S57 is not executed, and the process proceeds to step S58.

Figure 11:
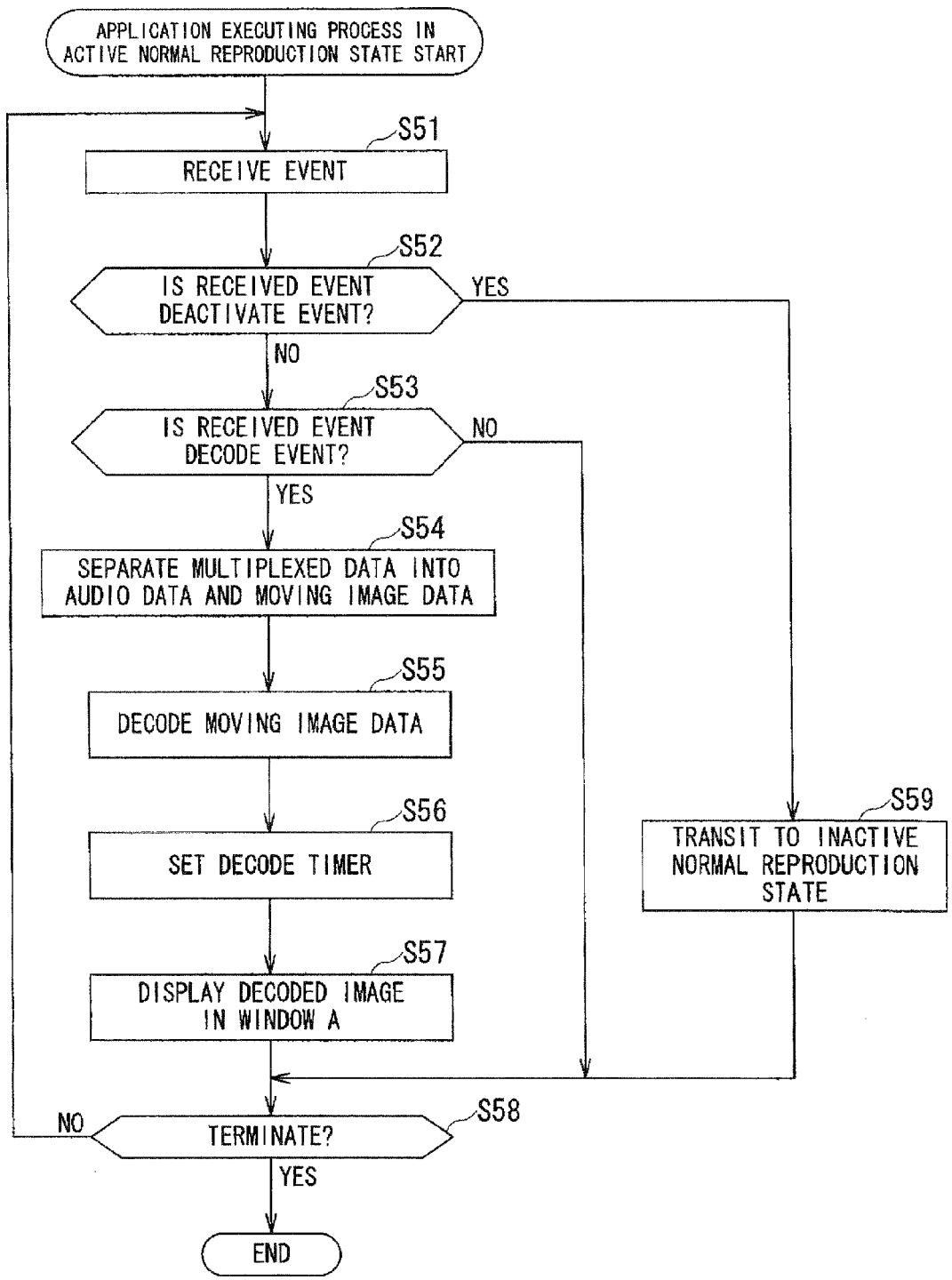
FIG. 11 is a flowchart illustrating an application executing process in an active normal reproduction state in the cellular phone shown in FIG. 9.

On the other hand, if the control unit 41 determines in step S53 in FIG. 11 that the event received by the application A is a deactivate event, in step S59, the control unit 41 changes the state of the application A from the active normal reproduction state to the inactive normal reproduction state in accordance with the received deactivate event, as shown in FIG. 10.

If the state of the application A has transited from the active normal reproduction state to the inactive normal reproduction state in step S59 in FIG. 11, after the state transition, an application executing process at the time of inactive normal reproduction in FIG. 12 described later is executed.

Next, referring to a flowchart in FIG. 12, a description will be given in detail of an application executing process performed if a key input event is received in the inactive normal reproduction state in the cellular phone 1 shown in FIG. 9. During the application executing process in the inactive normal reproduction state, the application A is inactive. Thus, if the operating key 14 of the input unit is operated by the user, the control unit 41 recognizes the corresponding input as being not accepted by the application A. The processes of step S61, and steps S63 to S69 in FIG. 12 are the same as the processes of steps S51 to S58 in FIG. 11, and detailed description thereof is omitted to avoid repetition.

In step S62, the control unit 41 executes the application A, and determines whether or not the received event is an event caused by a key (for example, the operating key 14) other than the active switching key 22. If the control unit 41 determines in step S62 that the received event is not an event caused by a key other than the active switching key 22, the process proceeds to step S63, and it is determined whether or not the event received by the application A is an activate event. The processes of steps S63 to S70 in FIG. 12 are basically the same as the processes of steps S52 to S59 in FIG. 11. However, if the control unit 41 determines in step S63 that the event received by the application A is an activate event, in step S70, the current state of the application A transits from the inactive normal reproduction state to the active normal reproduction state.

Figure 12:
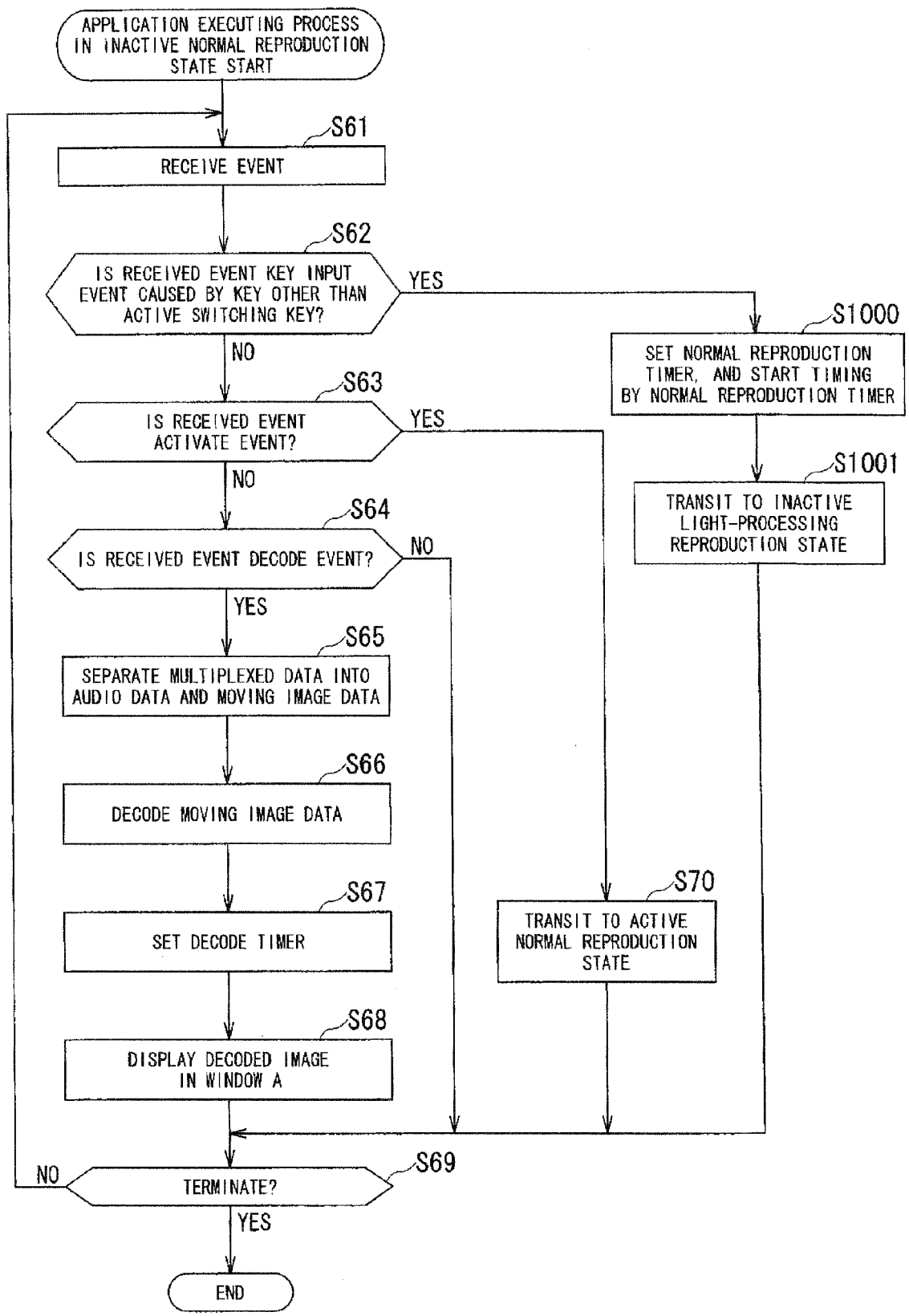
FIG. 12 is a flowchart illustrating an application executing process in an inactive normal reproduction state in the cellular phone shown in FIG. 9.

If the state of the application A has transited from the inactive normal reproduction state to the active normal reproduction state in step S70 in FIG. 12, after the state transition, the above-described application executing process at the time of active normal reproduction in FIG. 11 is executed.

If the control unit 41 determines in step S62 that the received event is not an event caused by a key (for example, the operating key 14) other than the active switching key 22, the control unit 41 recognizes the received event as being an event with respect to another application (application B) that is running simultaneously in the multi-window system. Then, in step S100, the control unit 41 sets a normal reproduction timer with a predetermined time period by using the clock circuit 47, and starts timing of the normal reproduction timer. This normal reproduction timer is used for performing light-processing reproduction for a fixed period of time.

In step S1001, the control unit 41 executes the application A, and in order to perform lighter processing than normal processing, the control unit 41 causes the state of the application A to transit from the inactive normal reproduction state to the inactive light-processing reproduction state, as shown in FIG. 10.

If the state of the application A has transited from the inactive normal reproduction state to the inactive light-processing reproduction state in step S1001 in FIG. 12, after the state transition, an application executing process in the inactive light-processing reproduction state in FIG. 13 described later is executed, and a moving image reproduction process at the time of inactive light-processing reproduction is executed.

Next, referring to a flowchart in FIG. 13, a description will be given in detail of an application executing process performed if a key input event is received in the inactive light-processing reproduction state in the cellular phone 1 shown in FIG. 9. During the application executing process in the inactive light-processing reproduction state, the application A is inactive. Thus, if the operating key 14 of the input unit is operated by the user, the control unit 41 recognizes the corresponding input as being not accepted by the application A. Description of portions that overlap with the processing in FIG. 12 will be omitted as appropriate.

In step S72, the control unit 41 executes the application A, and determines whether or not the event received by the application A is an activate event. If the control unit 41 determines in step S72 that the event received by the application A is an activate event, in step S73, an instruction for switching between the currently active application B and the currently inactive application A is made as the user depresses the active switching key 22, and the control unit 41 recognizes that the user's line of sight is directed to the application A. Since it is no longer necessary to perform light-processing reproduction, the control unit 41 terminates (stops) the normal reproduction timer that has started timing by using the clock circuit 47.

In step S74, the control unit 41 executes the application A, and causes the state of the application A to transit from the inactive light-processing reproduction state to the active normal reproduction wait state as shown in FIG. 10, in accordance with the received deactivate event.

If the state of the application A has transited from the inactive light-processing reproduction state to the active normal reproduction wait state in step S74, after the state transition, an application executing process in the active normal reproduction wait state in FIG. 15 described later is performed, and a moving image reproduction process at the time of active normal reproduction wait is executed.

On the other hand, if the control unit 41 determines in step S72 that the event received by the application A is not an activate event, in step S76, the control unit 41 executes the application A, and determines whether or not the predetermined time period set in advance in step S1000 in FIG. 12 has elapsed, and the normal reproduction timer has expired. If the control unit 41 determines in step S76 that the predetermined time period set in advance has elapsed, and the normal reproduction timer has expired, the control unit 41 recognizes that although the normal reproduction timer has been set to start timing to execute an inactive light-processing reproduction process, no input with the operating key 14 or the like using the application B has been made by the user within the predetermined time period, and hence a key input using the operating key 14 is not made very frequently. Then, in step S77, the control unit 41 causes the state of the application A to transit from the inactive light-processing reproduction state to the inactive normal reproduction wait state as shown in FIG. 10.

If the state of the application A has transited from the inactive light-processing reproduction state to the inactive normal reproduction wait state in step S77, after the state transition, an application executing process in the inactive normal reproduction wait state in FIG. 14 described later is performed, and a moving image reproduction process at the time of inactive normal reproduction wait is executed.

Next, if the control unit 41 determines in step S76 that the predetermined time period set in advance has not elapsed, and the normal reproduction timer has not expired, in step S78, the control unit 41 executes the application A, and determines whether or not the received event is an event caused by a key (for example, the operating key 14) other than the active switching key 22. If the control unit 41 determines in step S78 that the received event is an event caused by a key other than the active switching key 22, the control unit 41 recognizes that after the normal reproduction timer has been set to start timing to execute an inactive light-processing reproduction process, an input with the operating key 14 using the application B has been made by the user within the predetermined time period, and hence a key input using the operating key 14 is made frequently. Then, in step S79, after resetting (terminating) the normal reproduction timer to a predetermined time period by using the clock circuit 47, the control unit 41 resumes timing by the normal reproduction timer. Thus, the period of time until the normal reproduction timer expires is extended, and it is attempted to maintain the inactive light-processing reproduction state. The timer may be either of a hard timer and a soft timer.

If the control unit 41 determines in step S78 that the received event is not an event caused by a key (for example, the operating key 14) other than the active switching key 22, in step S80, the control unit 41 determines whether or not the event received by the application A is a decode event. If the control unit 41 determines in step S80 that the event received by the application A is a decode event, in step S81, the control unit 41 executes the application A, reads multiplexed data stored in advance in the file system of the storage unit 42, and separates the read multiplexed data into audio data and moving image data. While the embodiment of the present invention assumes a case in which audio data and moving image data are stored in advance in the file system of the storage unit 42, the present invention is not limited to this. The present invention can be applied also to a case in which audio data and moving image data are not stored in advance in the storage section 42 or the like (in particular, in the case of, for example, an application related to reception of terrestrial digital broadcast waves using the terrestrial digital one-segment receiving unit 48).

In step S82, the control unit 41 executes the application A, and determines whether or not the current frame being processed during reproduction of moving image data is an I-frame. If the control unit 41 determines in step S82 that the current frame during reproduction of moving image data is an I-frame, in step S83, the control unit 41 executes the application A, and decodes this I-frame included in the separated moving image data in a predetermined decoding scheme, and generates a decoded digital moving image signal.

At this time, the control unit 41 executes the application A, and in parallel with the decoding process of the moving image data, decodes the separated audio data in a predetermined decoding scheme, generating a decoded digital audio signal. The control unit 41 PCM-decodes the digital audio signal by the PCM codec unit 38, and causes a PCM-decoded analog audio data signal to be output to the speaker 50.

In this way, when reproducing a moving image, part of the decode process of moving image data is omitted, thereby making it possible to allocate CPU resources preferentially to another application that is active. Also, at this time, output of sound following reproduction of the moving image can be continuously performed. Therefore, by taking usability into consideration, it is possible to ensure that even when part of the decoding process of moving image data is omitted, this does not impair the ease of use in moving image reproduction.

In step S84, the control unit 41 executes the application A, and sets a decode timer for prompting the next decoding process by using the clock circuit 47.

In step S85, the control unit 41 executes the application A, and controls the main display 17 to display the decoded moving image on the main display 17. The main display 17 displays the decoded moving image in accordance with control of the control unit 41.

Figure 13:
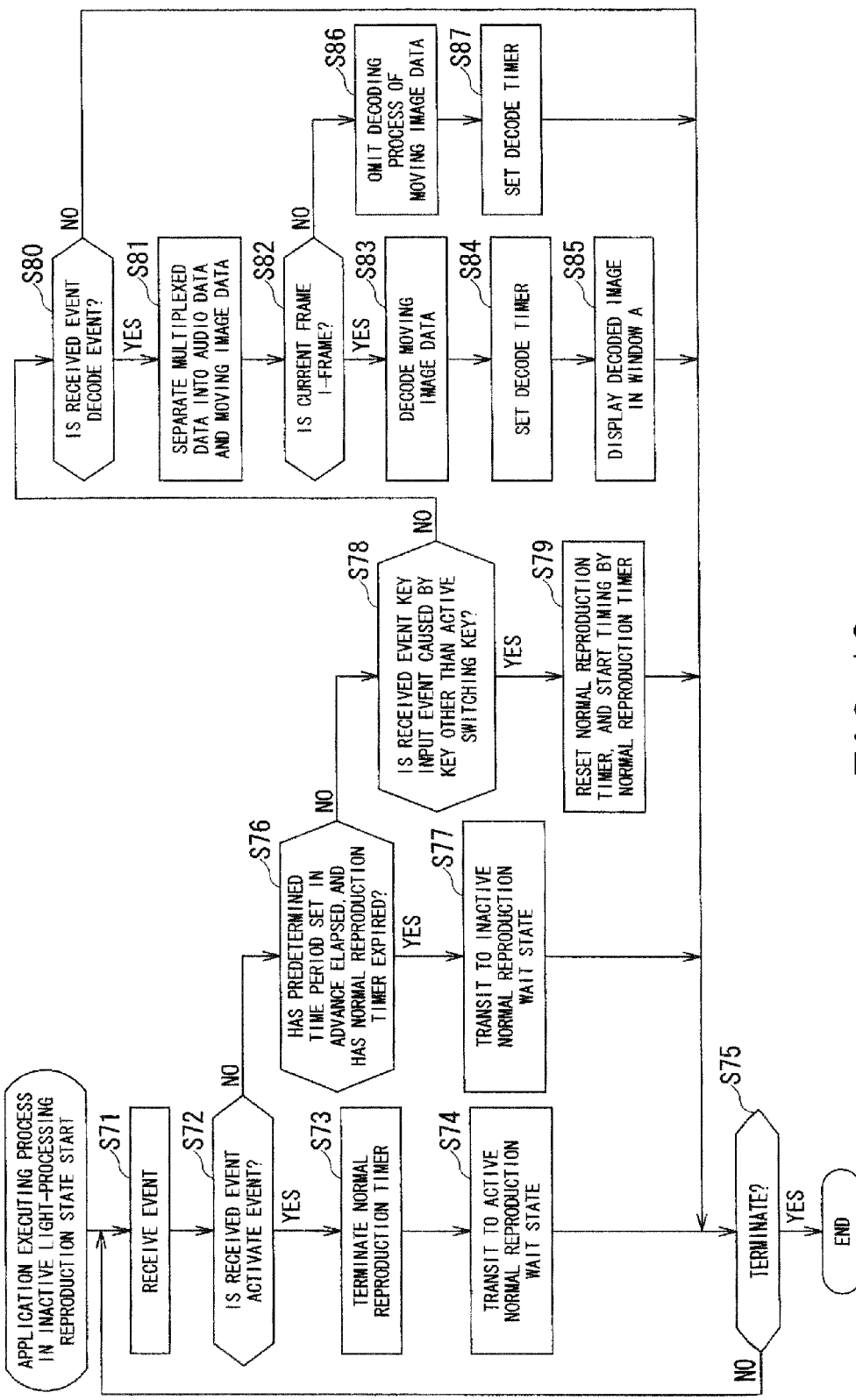
FIG. 13 is a flowchart illustrating an application executing process in an inactive light-processing reproduction state in the cellular phone shown in FIG. 9.

At this time, in a case when the application executing process is not terminated, and the current state of the application A is the active light-processing reproduction state, a normal reproduction timer elapse determining process is performed in step S76 in FIG. 13 until a new event is received by the application A from the application management unit, and unless the predetermined time period set in advance elapses, light moving image reproduction (reproduction of moving image data in which only I-frames are played back among frames included in moving image data, and P-frames and B-frames are not played back) at the time of inactive light-processing reproduction indicated by steps S81 to S87 is repeatedly performed with respect to the window A.

If the control unit 41 determines in step S82 that the current frame being processed during reproduction of moving image data is not an I-frame (that is, if the control unit 41 determines that the current frame being processed during reproduction of moving image data is a P-frame or a B-frame), in step S86, the control unit 41 cancels the decoding process of moving image data indicated by steps S83 to S85 so as to omit part of the decoding process of moving image data.

Thus, in a case when the state of the application A is the inactive light-process reproduction state, of frames included in moving image data, the decoding process of P-frames or B-frames is not performed, and the decoding process of only I-frames is performed, so the processing at the time of reproducing a moving image can be made lighter. Thereafter, in step S87, the control unit 41 executes the application A, and sets a decode timer for prompting the next decoding process by using the clock circuit 47.

If the control unit 41 determines in step S80 that the event received by the application A is not a decode event, the process proceeds to step S75.

Referring to a flowchart in FIG. 14, a description will be given in detail of an application executing process performed when a key input event is received in the inactive normal reproduction wait state in the cellular phone 1 shown in FIG. 9. Description of portions that overlap with the processing in FIG. 13 will be omitted as appropriate.

In step S92, the control unit 41 executes the application A, and determines whether or not the received event is an event caused by a key (for example, the operating key 14) other than the active switching key 22. If the control unit 41 determines in step S92 that the received event is an event caused by a key (for example, the operating key 14) other than the active switching key 22, the control unit 41 recognizes the received event as being an event with respect to another application (application B) that is running simultaneously in the multi-window system. Then, in step S93, the control unit 41 executes the application A, and by using the clock circuit 47, sets a normal reproduction timer with a predetermined time period again, and starts the timing of the normal reproduction timer.

In step S94, the control unit 41 executes the application A, and in order to perform lighter processing than normal processing, the control unit 41 causes the state of the application A to transit from the inactive normal reproduction state to the inactive light-processing reproduction state as shown in FIG. 10.

If the state of the application A has transited from the inactive normal reproduction wait state to the inactive light-processing reproduction state in step S94, the application executing process in the inactive light-processing reproduction state in FIG. 13 is performed, and a moving image reproduction process at the time of inactive light-processing reproduction is executed.

If the control unit 41 determines in step S92 that the received event is not an event caused by a key (for example, the operating key 14) other than the active switching key 22, in step S96, the control unit 41 executes the application A, and determines whether or not the received event is an activate event. If the control unit 41 determines in step S96 that the received event is an activate event, in step S97, the control unit 41 executes the application A, and causes the state of the application A to transit from the inactive normal reproduction wait state to the active normal reproduction wait state as shown in FIG. 10.

If the state of the application A has transited from the inactive normal reproduction wait state to the active normal reproduction wait state in step S97 in FIG. 14, an application executing process in the active normal reproduction wait state in FIG. 15 described later is performed, and a moving image reproduction process at the time of active normal reproduction wait is executed.

If the control unit 41 determines in step S96 that the received event is not an activate event, the process proceeds to step S98, and the processes from step S98 onwards are executed. The processes of steps S98 to S103, and steps S105 and S106 in FIG. 14 are basically the same as the processes of steps S88 to 87 in FIG. 13, and detailed description thereof is omitted to avoid repetition. However, in step S104, the control unit 41 causes the state of the application A to transit from the inactive normal reproduction wait state to the inactive normal reproduction state as shown in FIG. 10.

If the state of the application A has transited from the inactive normal reproduction wait state to the inactive normal reproduction state in step S104 in FIG. 14, the application executing process in the inactive normal reproduction state in FIG. 12 described later is performed, and a moving image reproduction process at the time of inactive normal reproduction wait is executed.

Referring to a flowchart in FIG. 15, a description will be given in detail of processing performed when a key input event is received in the active normal reproduction wait state in the cellular phone 1 shown in FIG. 9. Description of portions that overlap with the processing in FIG. 14 will be omitted as appropriate.

In step S112, the control unit 41 executes the application A, and determines whether or not the received event is a deactivate event. If the control unit 41 determines in step S112 that the received event is not a deactivate event, the process proceeds to step S113, and the processes from step S113 onwards are executed. The processes of steps S113 to S118, and steps S120 to S122 in FIG. 15 are basically the same as the processes of step S95, steps S98 to S103, and steps S105 and S106 in FIG. 14, and detailed description thereof is omitted to avoid repetition. However, in step S119, the control unit 41 causes the state of the application A to transit from the active normal reproduction wait state to the active normal reproduction state as shown in FIG. 10.

If the control unit 41 determines in step S112 that the received event is a deactivate event, in step S123, the control unit 41 causes the state of the application A to transit from the active normal reproduction wait state to the inactive normal reproduction wait state in accordance with the received deactivate event, as shown in FIG. 10.

Figure 14:
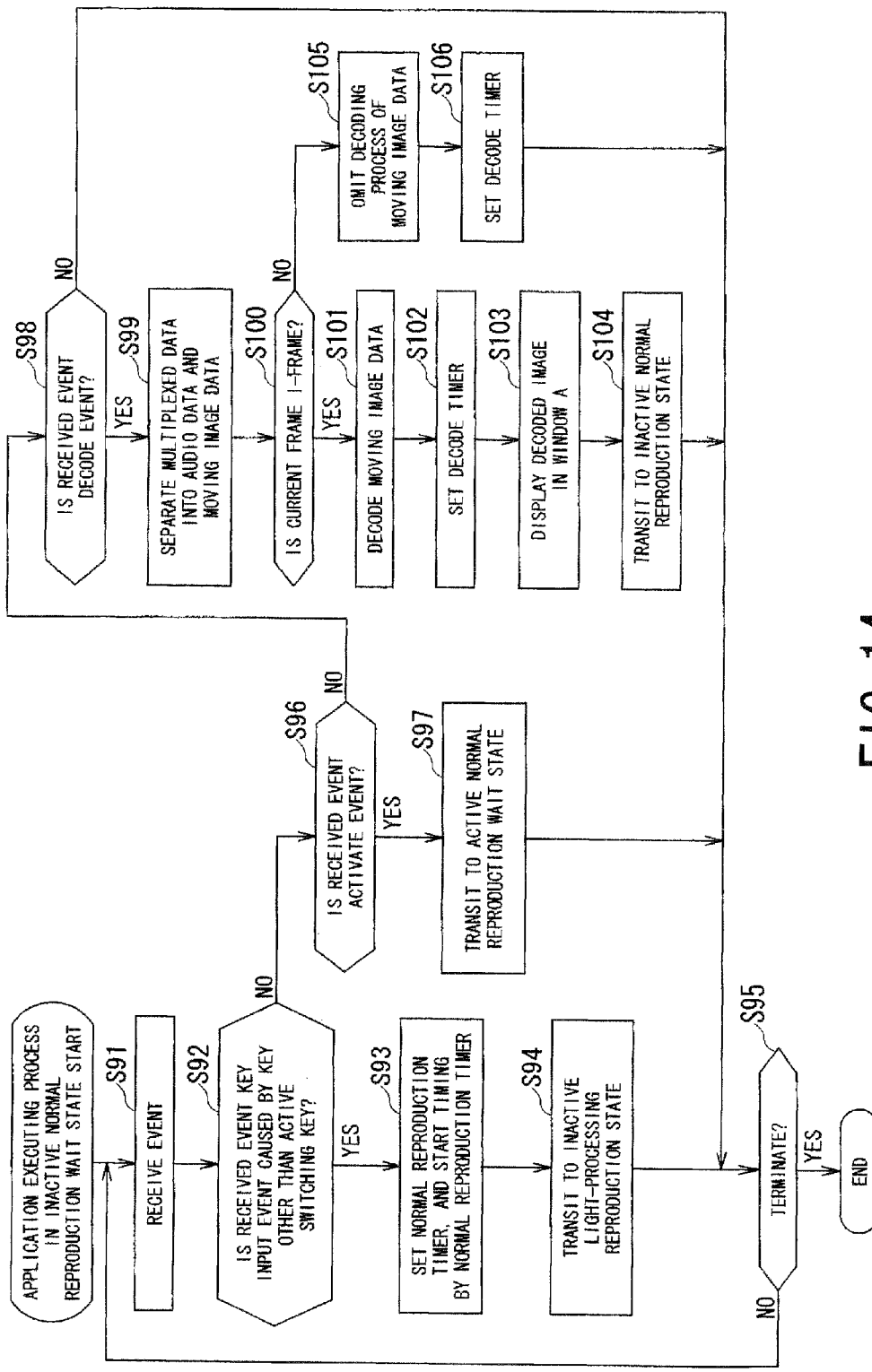
FIG. 14 is a flowchart illustrating an application executing process in an inactive normal reproduction wait state in the cellular phone shown in FIG. 9.
Figure 15:
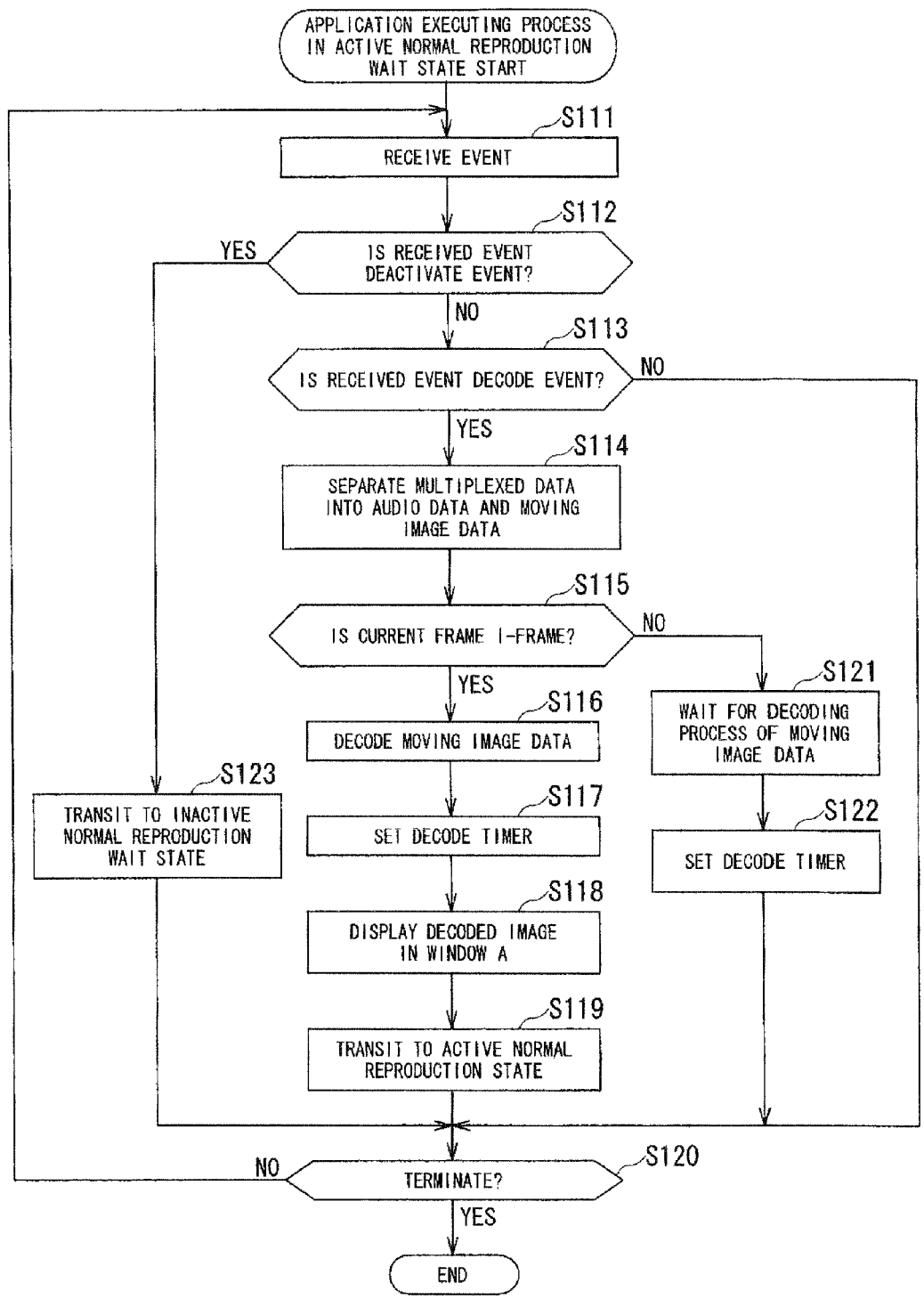
FIG. 15 is a flowchart illustrating an application executing process in an active normal reproduction wait state in the cellular phone shown in FIG. 9.

If the state of the application A has transited from the active normal reproduction wait state to the inactive normal reproduction wait state in step S123 in FIG. 15, the application executing process in the inactive normal reproduction wait state in FIG. 14 is performed, and a moving image reproduction process at the time of inactive normal reproduction wait is executed. Then, until a new event is received by the application A from the application management unit, moving image reproduction at the time of inactive reproduction wait indicated by steps S99 to S104 in FIG. 14 is performed with respect to the window A, and to cause the state of the application A to transit to inactive normal reproduction, among frames included in moving image data, a decoding process of an I-frame is waited for. After the decoding process of an I-frame is executed, the state of the application transits to inactive normal reproduction.

The embodiment of the present invention can be configured such that, in a multi-window system in which at least a first application program and a second application program run simultaneously, when any given key input is made, an event related to key input is notified to each application program; the first application program and the second application program are both capable of transiting to an active state or an inactive state; in a case when the state of the first application program is inactive and the state of the second application program is active, whether or not an input has been made with respect to the second application program is made on the basis of the event notified to the first application program; if it is determined that an input has been made with respect to the second application program, a predetermined time period to be timed is set, and the set predetermined time period is timed; upon execution of the first application program that is an application program related to reproduction of a moving image, multiplexed data obtained by multiplexing audio data and moving image data is separated into the audio data and the moving image data; upon execution of the first application program, the separated moving image data is decoded in a predetermined decoding scheme; and until the predetermined time period is timed out, a control is performed so as to omit a decoding process of a predetermined frame included in the moving image data, among decoding processes of the moving image data.

Therefore, in the multi-window system in which a plurality of window applications run simultaneously on the screen, and a plurality of windows are displayed simultaneously, if an application program that places a high load on the CPU, for example, an application program related to reproduction of moving images exists among the window applications that are running, when commands are frequently input to the cellular phone 1 as the input unit is operated by the user by using another application program (for example, a mailer) that is active, CPU resources are allocated preferentially to the window application that is active, and processing by the active window application can be performed preferentially. As a result, the responsiveness of the cellular phone 1 using the multi-window system can be improved, providing enhanced ease of use for the user. Further, in other cases, normal moving image reproduction can be performed by performing a normal decoding process without omission. Therefore, it is possible to enhance convenience when running a plurality of application programs in the multi-window system.

While in FIG. 9 the description is given explicitly for the case where the application B executed in the window B of the main display 17 is an application program related to transmitting/receiving and generation of e-mails, the present invention is not limited to this. For example, the present invention may be also applied to an application program related to a schedule pad or a memo pad.

While in the embodiment of the present invention the description is given explicitly for the case where any given key input using the operating key 14 or the like is made with respect to an application program to be run in the multi-window system, the present invention is not limited to this. For example, the present invention can be also applied to cases where another input device such as a touch panel is used.

While in FIG. 9 the description is given explicitly for the case where the application A executed in the window A of the main display 17 is an application program related to moving image reproduction, the present invention is not limited to this. For example, in the present invention, the application A may be an application program related to thumbnail display of a still image or a moving image or an application program related to a game. In the following, a description will be given of a case where the present invention is applied to an application program related to thumbnail display.

Figure 16:
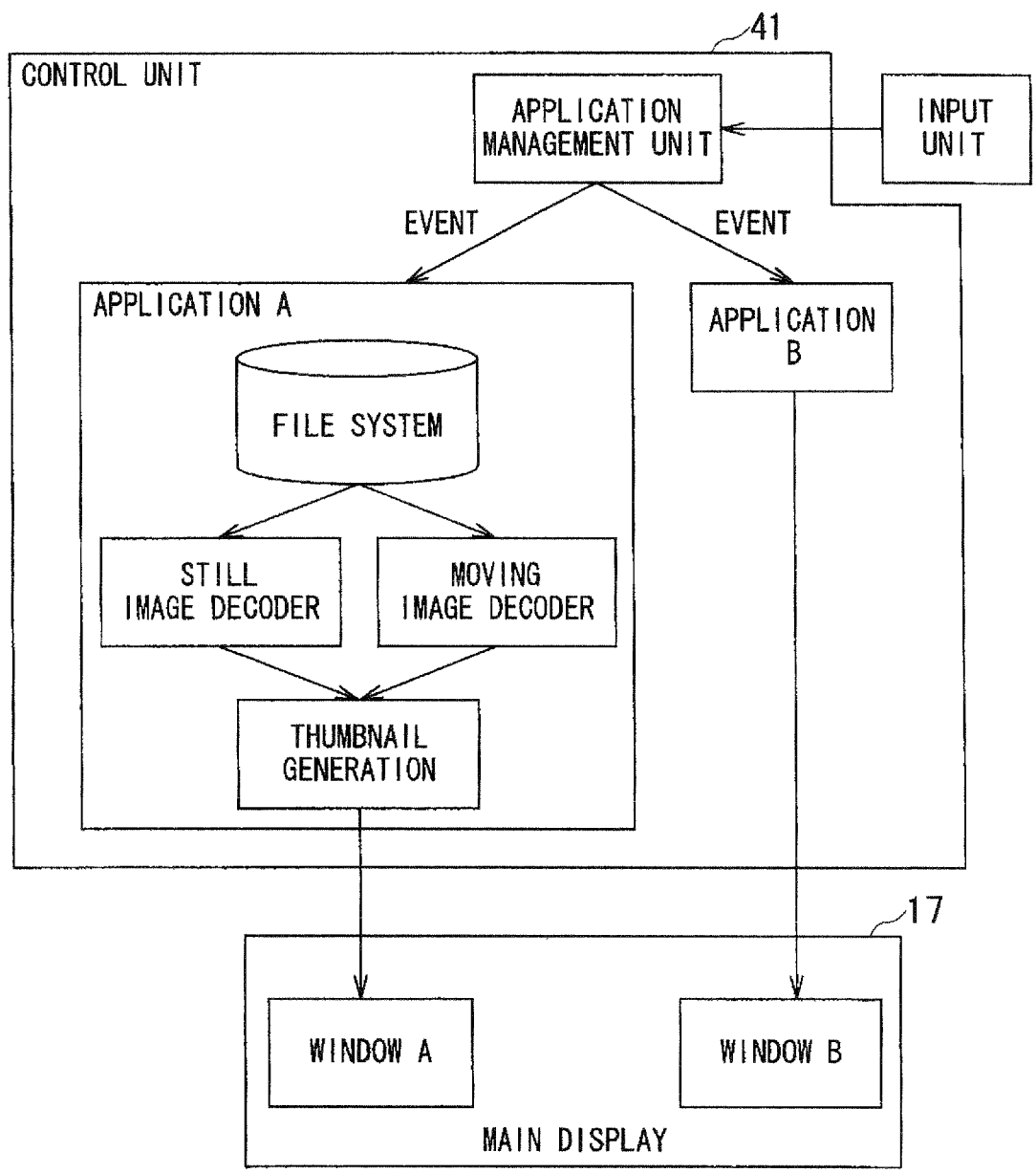
FIG. 16 is a diagram showing in detail another functional configuration that can be executed by a control unit of the cellular phone shown in FIG. 2, in a multi-window system.

FIG. 16 shows in detail another functional configuration that can be executed by the control unit 41 of the cellular phone 1 in FIG. 2. A description of portions corresponding to those in the configuration in FIG. 4 will be omitted to avoid repetition.

Figure 17:
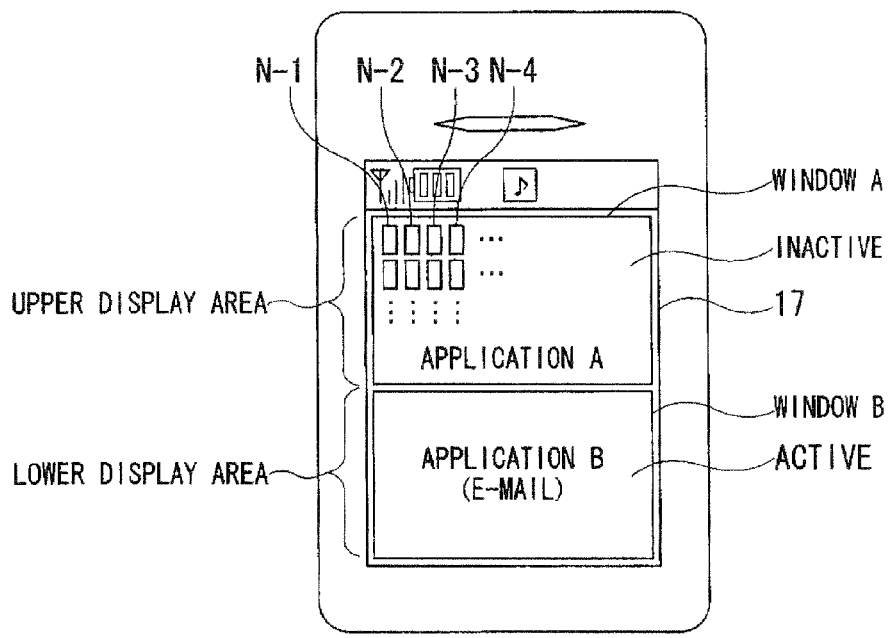
FIG. 17 is a view showing a display example of thumbnails.

The control unit 41 executes an application A that is an application program related to thumbnail display, and performs a video decoding process of still images and moving images, and a thumbnail creating process as software processing. That is, the control unit 41 executes the application A that is an application program related to thumbnail display, reads still image data or moving image data stored in advance in the file system of the storage unit 42, and decodes the read still image data or moving image data in a predetermined decoding scheme to generate decoded digital still image signals or decoded digital moving image signals (still image decoding process and moving image decoding process). Also, the control unit 41 executes the application A, and on the basis of the generated digital still image signals related to still images or the generated digital moving image signals related to moving images, generates pieces of thumbnail image data (thumbnail image signals) related to the still images or moving images, and stores the pieces of generated thumbnail image data (thumbnail image signals) into the video RAM of the display drive unit. Then, the control unit 41 drives the display drive unit, and arranges a plurality of thumbnail images based on the plurality of pieces of generated thumbnail image data (thumbnail image signals) in a predetermined sequence for display in the window A of the main display 17 as shown in FIG. 17, for example. For example, in the case of FIG. 17, thumbnail images N-1, N-2, N-3, N-4, and so on are displayed in a predetermined sequence in the window A of the main display 17.

In the case of moving image reproduction shown in FIG. 9 or the like, processing that is lighter than normal moving image reproduction processing is performed such that, for example, part of processing is omitted to omit a decoding process of P-frames constituting moving image data. However, in the case of thumbnail display, a wait process is inserted in between processing in the thumbnail display process Thus, CPU resources can be allocated preferentially to an application B other than the application A that is an application program related to thumbnail display.

Figure 18:
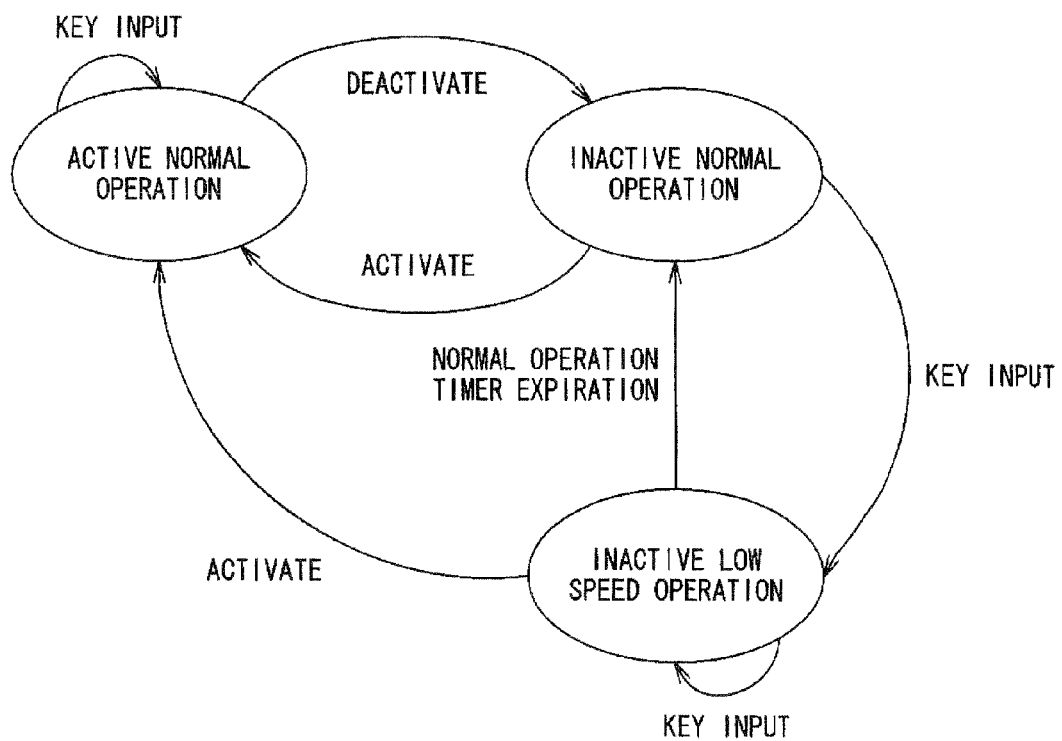
FIG. 18 is a diagram showing state transitions of an application during execution of an application that is an application program related to thumbnail display.

FIG. 18 is a state transition diagram of the application A during execution of the application A that is an application program related to thumbnail display. In the state transition diagram shown in FIG. 18, the state transition diagram shown in FIG. 6 is divided more finely in accordance with processing executed by the application A. As shown in FIG. 18, there are three states of the application A, active normal operation, inactive normal operation, and inactive low speed operation.

First, an active normal operation state represents a state in which the application A is active, thumbnail images are displayed at normal speed, and if the operating key 14 of the input unit is operated by the user, the corresponding input is accepted by the application A. At this time, if the application A receives (accepts) a deactivate event, the state of the application A transits from the active normal operation state to an inactive normal operation state.

Second, an inactive normal operation state represents a state in which the application A is inactive, and thumbnail images are displayed at normal speed. If the operating key 14 or the like of the input unit is operated by the user in the inactive normal operation state, the corresponding input is recognized as being not accepted by the application A (that is, the input is recognized as having been accepted by the application ). Thereafter, the state transits to an inactive low speed operation state. When the application A receives (accepts) an activate event, the state of the application A transits from the inactive normal operation state to the active normal operation state. If transiting to an inactive low speed operation state, timing by a fixed-period timer is stated.

Third, an inactive low speed operation state represents a state in which the application A is inactive, and thumbnail display is performed at low speed by inserting a wait (predetermined wait time) between thumbnail generations during thumbnail display operation. If in the inactive low speed operation state, upon expiration of a timer, the state of the application A transits from the inactive low speed operation state to the inactive normal operation state. If the application A receives (accepts) a deactivate event, the state of the application A transits from the inactive low speed operation state to the active normal operation state.

The three transition states (the active normal operation state, inactive normal operation state, and inactive low speed operation state) of the application A in FIG. 18 correspond to the three states (the active normal reproduction state, the inactive normal reproduction state, and the inactive light-processing reproduction state) shown in FIG. 10.

Figure 19:
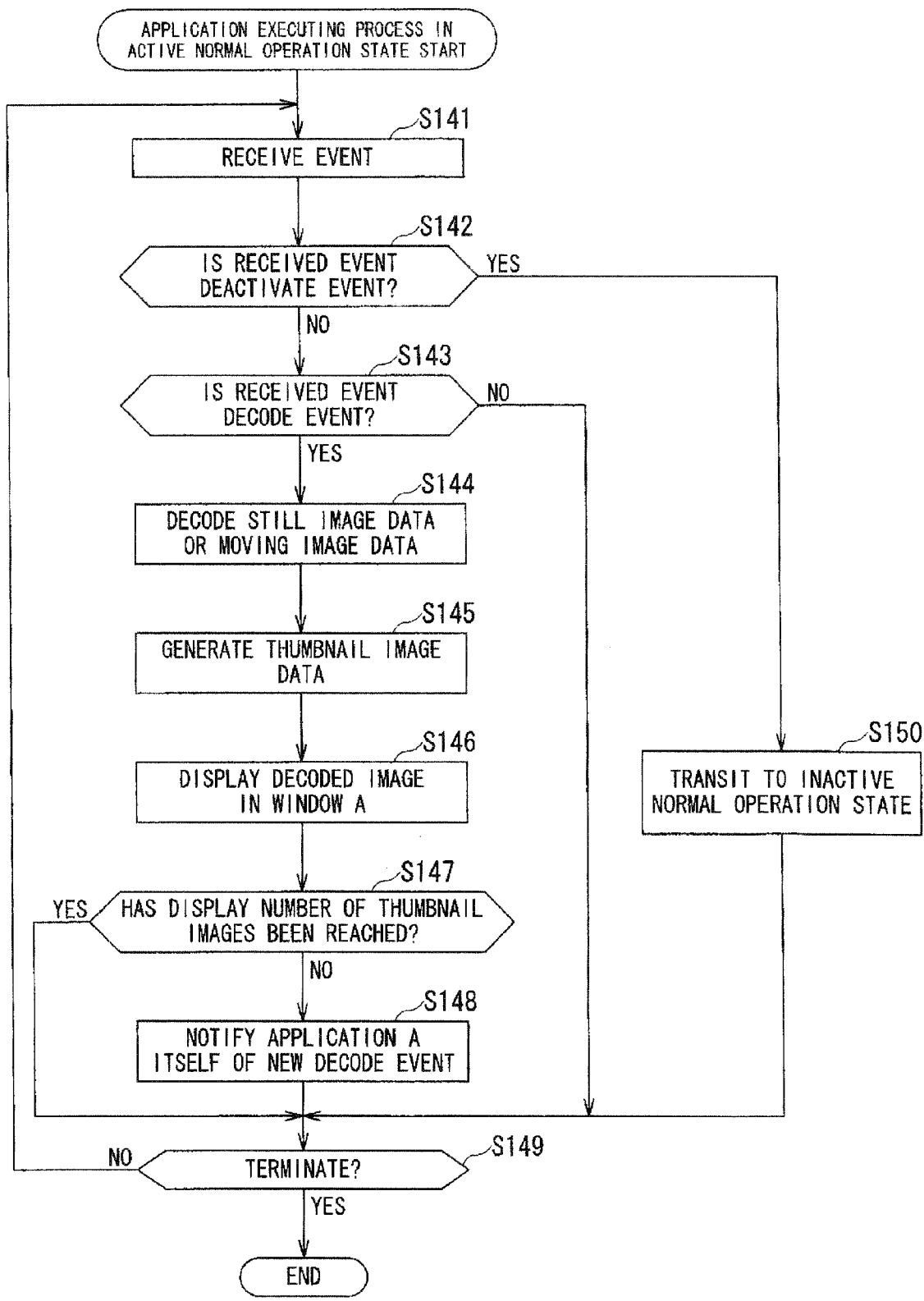
FIG. 19 is a flowchart illustrating an application executing process in an active normal operation state in the cellular phone shown in FIG. 16.

Referring to a flowchart in FIG. 19, a description will be given in detail of an application executing process in the active normal operation state in the cellular phone 1 shown in FIG. 16. The processing in FIG. 19 is basically the same as the processing in FIG. 12, and thus description thereof is omitted to avoid repetition.

In step S141, the control unit 41 executes the application A (application program related to thumbnail display) that is to be run simultaneously by using the multi-window system, and various events sequentially notified from the application management unit (for example, an event related to a key input made by a key other than the active switching key 22, an activate event, a deactivate event, and a decode event) are received by the application A.

The application A is activated when the operating key 14 is operated by the user, and a decoding process following thumbnail display is started.

In step S142, the control unit 41 executes the application A that is an application program related to thumbnail display, and determines whether or not the event received by the application A is a deactivate event. If the control unit 41 determines in step S142 that the event received by the application A is not a deactivate event, in step S143, the control unit 41 determines whether or not the event received by the application A is a decode event. If the control unit 41 determines in step S143 that the event received by the application A is a decode event, in step S144, the control unit 41 executes the application A, and reads still image data or moving image data stored in advance in the file system of the storage unit 42, and decodes the read still image data or moving image data in a predetermined decoding scheme, generating decoded still image signals or decoded digital moving image signals. Of course, the present invention is not limited to this but may be applied also to a case in which still image data or moving image data is not stored in advance in the storage section 42 or the like (in particular, in the case of, for example, an application related to reception of terrestrial digital broadcast waves using the terrestrial digital one-segment receiving unit 48).

In step S145, the control unit 41 executes the application A, and on the basis of the generated digital still image signals related to still images or the generated digital moving image signals related to moving images, generates pieces of thumbnail image data (thumbnail image signals) related to the still images or moving images. In step S146, the control unit 41 executes the application A, and stores the pieces of generated thumbnail image data (thumbnail image signals) into the video RAM of the display drive unit (not shown). Then, the control unit 41 drives the display drive unit (not shown), and arranges a plurality of thumbnail images based on the plurality of pieces of generated thumbnail image data (thumbnail image signals) in a predetermined sequence for display in the window A of the main display 17 as shown in FIG. 17, for example. For example, in the case of FIG. 17, the thumbnail images N-1, N-2, N-3, N-4, and so on are sequentially displayed in a predetermined sequence in the window A of the main display 17 (in the order of the thumbnail image N-1, followed by the thumbnail image N-2).

In step S147, the control unit 41 executes the application A, and successively counts the number of thumbnail images displayed by thumbnail display, and determines whether or not the number has reached a preset display number of thumbnail images. If the control unit 41 determines in step S147 that the preset display number of thumbnail images has not been reached, in step S148, the control unit 41 notifies the application A itself of a new decode event. Thereafter, if it is determined in step S149 not to terminate the application executing process, the process returns to step S141, and the processes from step S141 onwards are repeatedly executed. Thus, a new decode event is successively notified to the application A itself until the preset display number of thumbnail images is reached. If the control unit 41 determines in step S147 that the preset display number of thumbnail images has been reached, the process of step S148 is skipped.

On the other hand, if the control unit 41 determines in step S142 that the received event is a deactivate event, in step S150, the control unit 41 executes the application A, and causes the state of the application A to transit from the active normal operation state to the inactive normal operation state in accordance with the received deactivate event, as shown in FIG. 18.

Figure 20:
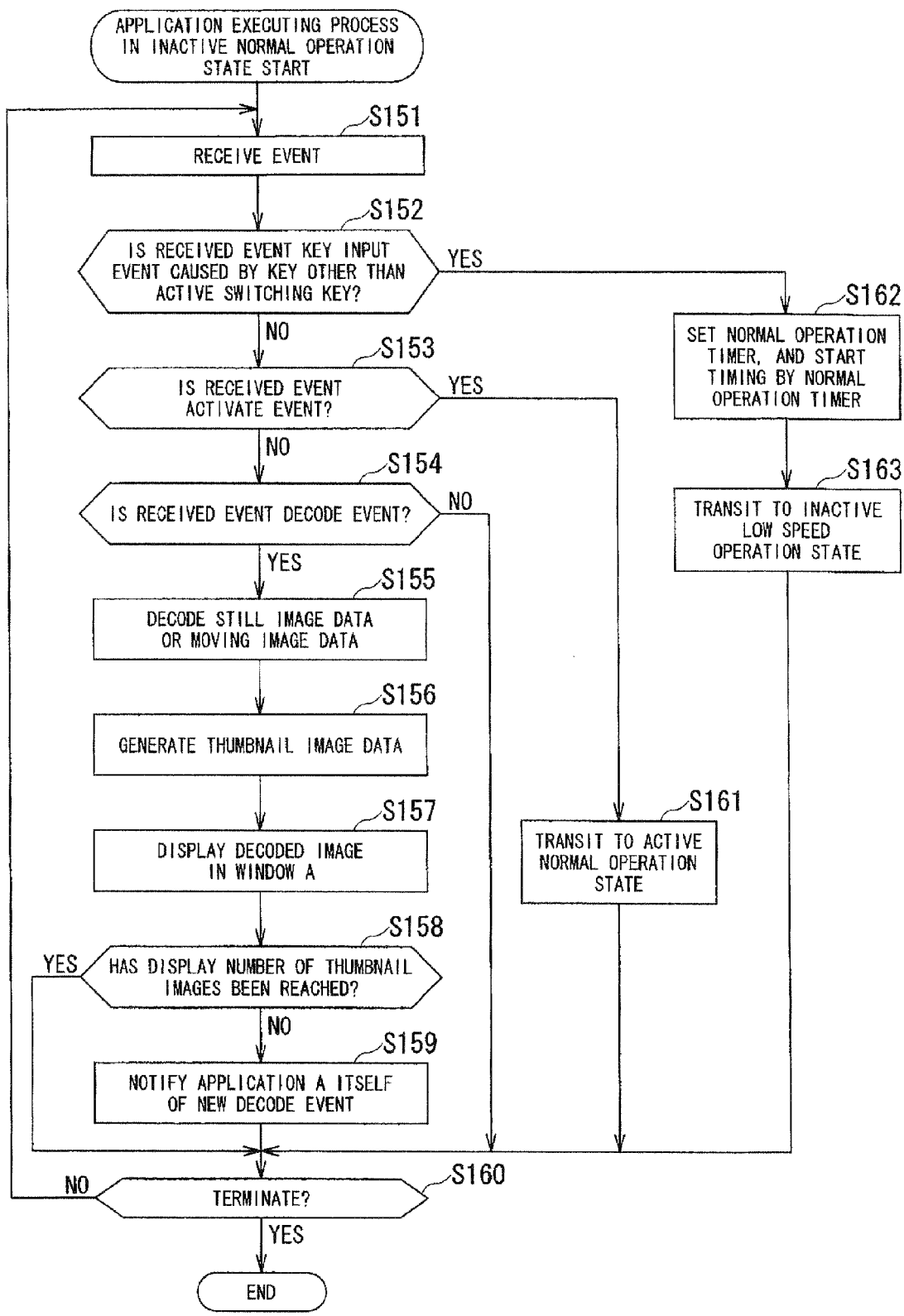
FIG. 20 is a flowchart illustrating an application executing process in an inactive normal operation state in the cellular phone shown in FIG. 16.

On the other hand, if the state of the application A has transited from the active normal operation state to the inactive normal operation state in step S150, after the state transition, an application executing process in the inactive normal operation state in FIG. 20 described later is performed, and a thumbnail display process at the time of inactive normal operation is executed. At this time, in a case when the application executing process is not terminated, and the current state of the application A remains the inactive normal operation state, display of a thumbnail image at normal speed at the time of inactive normal operation is sequentially executed with respect to the window A until a new event is received by the application A from the application management unit.

Referring to a flowchart in FIG. 20, a description will be given in detail of an application executing process in the inactive normal operation state in the cellular phone 1 shown in FIG. 16. The processing in FIG. 20 is basically the same as the processing in FIG. 13 or FIG. 19, and thus description thereof is omitted to avoid repetition.

If the control unit 41 determines in step S152 that the received event is an event caused by a key (for example, the operating key 14) other than the active switching key 22, the control unit 41 recognizes the received event as being an event with respect to another application (application B) that is running simultaneously in the multi-window system. Then, in step S162, the control unit 41 executes the application A, and by using the clock circuit 47, sets a normal operation timer with a predetermined time period, and starts timing of the normal operation timer. This normal operation timer is used for displaying a thumbnail image at low speed for a fixed period of time.

In step S163, the control unit 41 executes the application A, and to perform lighter processing than normal processing, causes the state of the application A to transit from the inactive normal operation state to the inactive low speed operation state as shown in FIG. 18.

If the state of the application A has transited from the inactive normal operation state to the inactive low speed operation state in step S163 in FIG. 20, after the state transition, an application executing process in the inactive low speed operation state in FIG. 21 described later is executed. In a case when the application executing process is not terminated, and the current state of the application A remains the inactive low speed operation state, until a new event is received by the application A from the application management unit, a normal operation timer elapse determining process is performed, and low-speed thumbnail display at the time of inactive low speed operation is sequentially performed with respect to the window A in accordance with a predetermined sequence, unless a predetermined time period set in advance elapses.

Referring to a flowchart in FIG. 21, a description will be given in detail of an application executing process in the inactive low speed operation state in the cellular phone 1 shown in FIG. 16. The processing in FIG. 21 is basically the same as the processing in FIG. 13 or FIG. 19, and thus description thereof is omitted to avoid repetition.

If the control unit 41 determines in step S178 that the received event is not an event caused by a key (for example, the operating key 14 or the like) other than the active switching key 22, in step S180, the control unit 41 determines whether or not the event received by the application A is a decode event. If the control unit 41 determines in step S180 that the event received by the application A is a decode event, in step S181, the control unit 41 waits for a predetermined time between thumbnail images when performing thumbnail image display. Thus, as shown in FIG. 17, for example, in a case when the thumbnail images N-1, N-2, N-3, N-4, and so on are sequentially displayed in the window A of the main display 17, thumbnail image display is waited for a predetermined period of time between the thumbnail image N-1 and the thumbnail image N-2 that is displayed next, thus allowing thumbnail images to be displayed at low speed. At this time, the predetermined wait time corresponds to a period of time between each thumbnail image and the next displayed thumbnail image, in the flow of time in which the thumbnail images are displayed in the order of N-1, N-2, N-3, N-4, and so on. Of course, this predetermined wait time can be changed as appropriate, and this predetermined wait time is set longer when it is desired to allocate more CPU resources to other applications.

Figure 21:
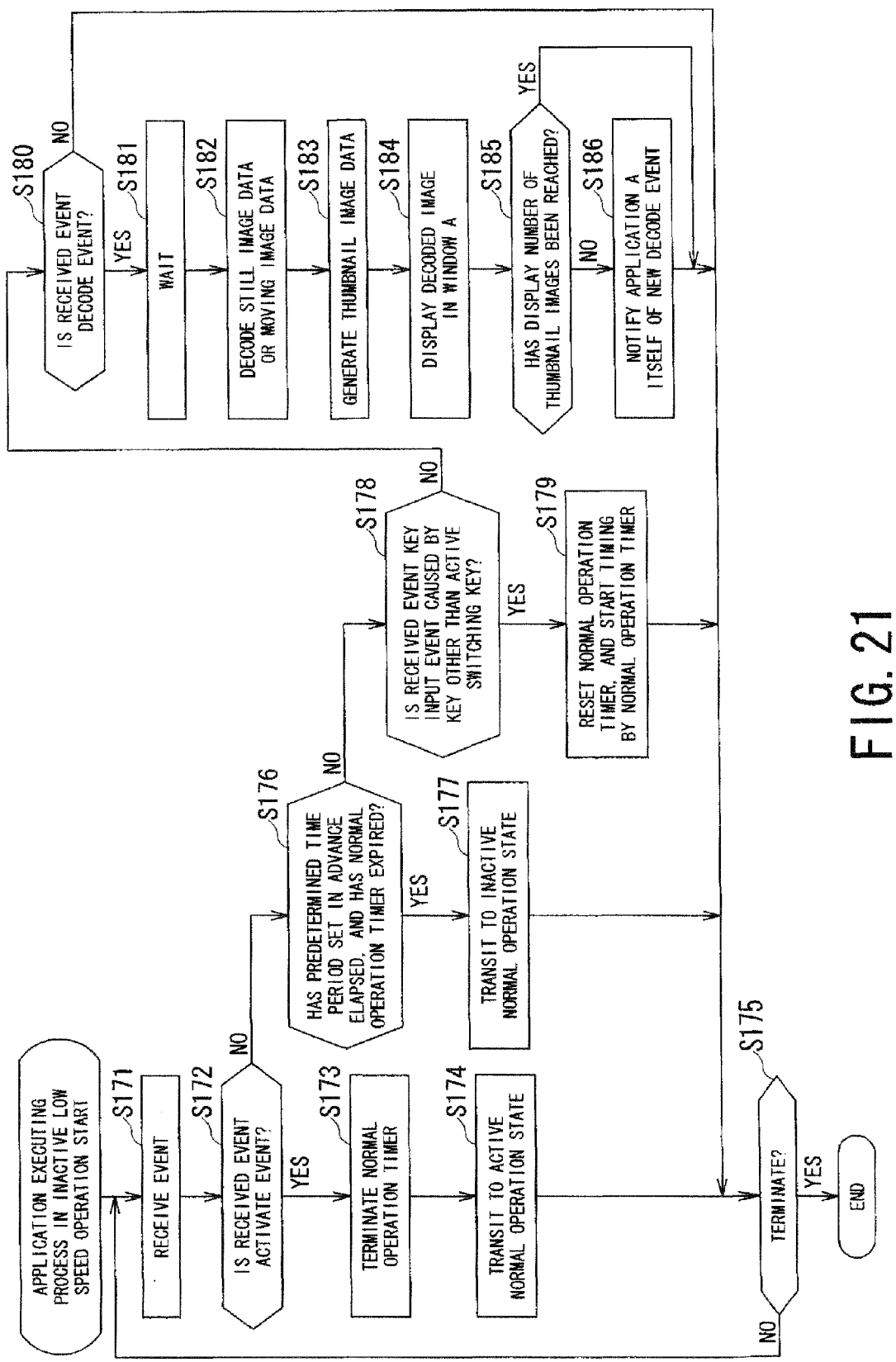
FIG. 21 is a flowchart illustrating an application executing process in an inactive low speed operation state in the cellular phone shown in FIG. 16.

Thereafter, in a case when the application executing process is not terminated, and the current state of the application A is the inactive low speed operation state, a normal operation timer elapse determining process is performed in step S176 in FIG. 21 until a new event is received by the application A from the application management unit, and unless a predetermined time period set in advance elapses, a thumbnail display process at the time of inactive low speed operation indicated by steps S180 to S186 in FIG. 21 is executed.

Thus, CPU resources are allocated preferentially to the window application that is active, and processing by the active window application can be performed preferentially. As a result, the responsiveness of the cellular phone 1 using the multi-window system can be improved, thus making it possible to enhance the ease of use for the user. Further, in other cases, thumbnail image can be performed at normal speed by performing a normal decoding process without inserting a wait. Therefore, it is possible to enhance convenience when running a plurality of application programs in the multi-window system.

In the case of FIG. 21, after completion of a generating process of a single thumbnail image related to a single still image or moving image, a wait is inserted in between each generating process to make the thumbnail display speed lower. However, the present invention is not limited to this. For example, a wait may be inserted in units of macroblock of a thumbnail image. That is, in a case when an event is notified to another active application during generation of a thumbnail image, even though the thumbnail image is being generated, a wait may be inserted for a period of time corresponding to the time required for generating a plurality of macroblocks. Thus, the responsiveness of operation can be improved in a case when user's operations using another application are being frequently performed.

Other than in the case of displaying thumbnail images, also in a case of displaying a single somewhat large still image in the window A of the main display 17, a wait process may be also inserted when user's operations using another application are being frequently performed.

In the case of the application processing in the cellular phone 1 described above with reference to FIGS. 11 to 15 or FIGS. 19 to 21, in a case when user's operations using another application that is active are being frequently performed, processing by an application that is inactive is made lighter. However, the present invention is not limited to this. For example, when the load on the CPU is likely to become high, a dummy key input event may be issued by an inactive application itself to make processing by the inactive application lighter in advance, thereby preventing an excessively high load from being placed on the CPU in advance. In the following, an application executing process using this method will be described. In particular, a description will be explicitly given of an executing process in which the application A that is an application program related to thumbnail display is executed in an inactive state. In this case as well, the processing in step S19 is the same, and thus description thereof is omitted to avoid repetition.

Referring to a flowchart in FIG. 22, a description will be given in detail of another application executing process in the inactive normal operation state in the cellular phone 1 shown in FIG. 16. The processes of steps S193 to S203 in FIG. 22 are basically the same as the processes of steps 153 to S163 in FIG. 20, and thus description thereof is omitted to avoid repetition.

Figure 22:
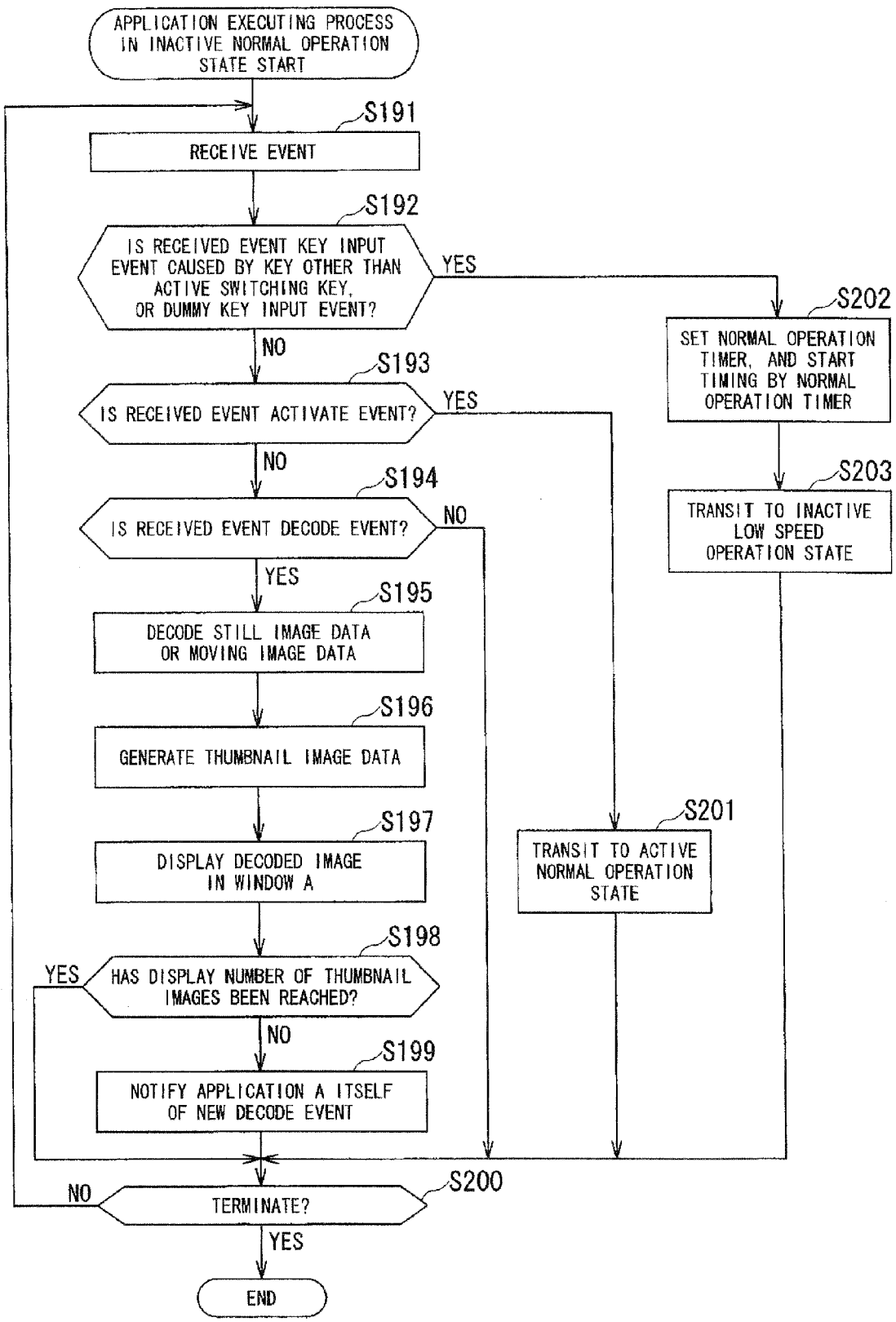
FIG. 22 is a flowchart illustrating another application executing process in an inactive normal operation state in the cellular phone shown in FIG. 16.

As the processing in the inactive normal operation state in FIG. 22, the following processing is assumed. That is, for example, in a case when e-mails are going to be transmitted/received by executing the application B that is an application program related to transmitting/receiving and generation of e-mails, since an increased load is likely to be placed on the CPU temporarily, a dummy key event is issued periodically to and received by the application A, not from the application management unit but by the application A in the inactive normal operation state itself. The dummy key input event may be notified to the application management unit once and then notified to each application via the application management unit. Also, the determination as to whether or not to issue a dummy input event may be made by measuring the load on the CPU.

Figure 23:
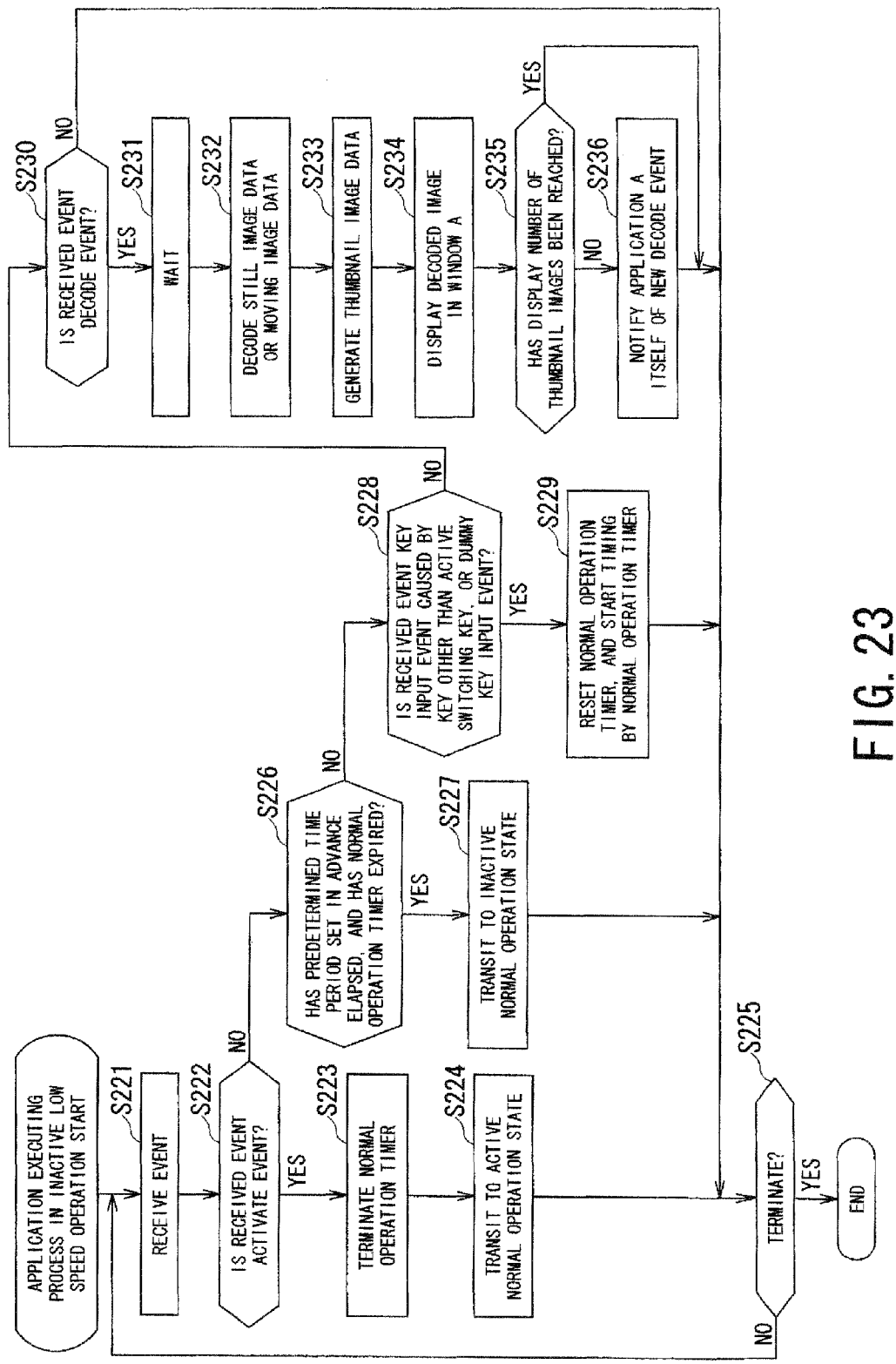
FIG. 23 is a flowchart illustrating another application executing process in an inactive low speed operation state in the cellular phone shown in FIG. 16.

In step S192, the control unit 41 executes the application A, and determines whether or not the received event is a key input event caused by a key other than the active switching key, or a dummy key input event. If the control unit 41 determines in step S192 that the received event is a key input event caused by a key other than the active switching key, or a dummy key input event, the process proceeds to step S202, processes from steps S202 onwards are executed, and the state of the application A transits to the inactive low speed operation state. Thereafter, the processing in FIG. 23 is executed. The processing in FIG. 23 is basically the same as the processing in FIG. 21.

Specifically, in a case when the application executing process is not terminated, and the current state of the application A is the inactive low speed operation state, a normal operation timer elapse determining process is performed in step S226 in FIG. 23 until a new event is received by the application A from the application management unit, and unless a predetermined time period set in advance elapses, a thumbnail display process at the time of inactive low speed operation indicated by steps S231 to S236 in FIG. 23 is executed.

In a case when the state of the application A is the inactive low speed operation state, if some event is received by the application A, the processes from step S221 onwards in FIG. 23 are executed, and in step S228, the control unit 41 executes the application A, and determines whether or not the received event is a key input event caused by a key other than the active switching key, or a dummy key input event. In a case in which the control unit 41 determines in step S228 that the received event is a dummy key input event as well, in step S229, by using the clock circuit 47, the control unit 41 resets (terminates) the normal reproduction timer to a predetermined time period, and then resumes timing by the normal reproduction timer. Thus, for example, in a case when e-mails are going to be transmitted/received via the antenna 31 by executing the application B that is an application program related to transmitting/receiving and generation of e-mails, the state of the application A transits to the inactive low speed operation state due to a dummy key input event issued by the application A in the inactive state itself, and the timer is reset due to a dummy key input event that is performed periodically, so thumbnail image display can be performed at low speed for a desired period of time. Therefore, it is possible to enhance convenience when running a plurality of application programs in the multi-window system.

The present invention can be also applied to, other than the cellular phone 1, a PDA, a personal computer, a portable game machine, a portable music player, a portable moving image player, and other such information processing apparatus.

The series of processes described above in the embodiment of the present invention can be executed by either of software and hardware.

While the embodiment of the present invention is directed to the case in which the steps in the flowcharts are processed time sequentially in the order as they appear in the description, the steps may not necessarily be processed time sequentially but may be also processed in parallel or independently.

What is claimed is:

1. An information processing apparatus for a multi-window system in which at least a first application program and a second application program run simultaneously, the first application program and the second application program having an active state and an inactive state, comprising:
   an event notifying unit configured to notify each of the first and second application programs of an input event related to input;
   an activate unit configured to activate one of the first and second application programs and deactivate the other application program;
   a determining unit configured to determine, when the first application program is in inactive state and the second application program is in active state, that the input event notified to the first application program by the event notifying unit is not an activate event caused by an active switching key but an event caused by a key other than the active switching key, and to determine whether or not an input is made to the second application program that is in active state;
   a timing unit configured to time a predetermined time period, if it is determined by the determining unit that an input is made to the second application program that is in active state; and
   a control unit configured to change a processing of the first application program to a light processing in which part of processing related to the first application program that is in inactive state is omitted, until the predetermined time period is timed out by the timing unit.

2. The information processing apparatus according to claim 1, wherein:
   the first application program is an application program related to reproduction of a moving image;
   the information processing apparatus further comprises;
      a separating unit configured to separate multiplexed data obtained by multiplexing audio data and moving image data, into the audio data and the moving image data, upon execution of the first application program, and
      an image data decoding unit configured to decode the moving image data separated by the separating unit in a predetermined decoding scheme, upon execution of the first application program; and
   the control unit is configured to control the image data decoding unit to omit a process related to the first application program by omitting a decoding process of a predetermined frame included in the moving image data, among decoding processes of the moving image data performed by the image data decoding unit.

3. The information processing apparatus according to claim 2, wherein the predetermined frame of which the decoding process is omitted by the control unit comprises a P-frame.

4. The information processing apparatus according to claim 2, wherein the control unit is configured to control the image data decoding unit to omit the decoding process of the predetermined frame, without omitting a decoding process of a first frame included in the moving image data, among the decoding processes of the moving image data performed by the image data decoding unit.

5. The information processing apparatus according to claim 4, wherein the first frame comprises an I-frame.

6. The information processing apparatus according to claim 2, further comprising:
   an audio data decoding unit configured to decode the audio data in a predetermined decoding method, upon execution of the first application program; and
   an output unit configured to output sound based on an audio signal decoded by the audio data decoding unit,
   wherein, even if the control unit controls the image data decoding unit to omit the decoding process of the predetermined frame, the output unit outputs sound based on the audio signal.

7. The information processing apparatus according to claim 1, wherein the control unit controls so as not to omit part of processing by the application program that is in inactive state, if the predetermined time period is timed out by the timing unit.

8. The information processing apparatus according to claim 1, wherein if it is further determined before the predetermined time period is timed out that an input made to the application program that is in active state, the timing unit resets the predetermined time period to be timed, and starts timing of the reset predetermined time period.

9. An information processing apparatus for a multi-window system in which at least a first application program and a second application program run simultaneously, the first application program and the second application program having an active state and an inactive state, comprising:
   an event notifying unit configured to notify each of the first and second application programs of an input event related to input;
   an activate unit configured to activate one of the first and second application programs and deactivate the other application program;
   a determining unit configured to determine, when the first application program is in inactive state and the second application program is in active state, that the input event notified to the first application program by the event notifying unit is not an activate event caused by an active switching key but an event caused by a key other than the active switching key, and to determine whether or not an input is made to the second application program that is in active state;
   a timing unit configured to time a predetermined time period, if it is determined by the determining unit that an input is made to the second application program that is in active state; and a control unit configured to change a processing of the first application program to a light processing in which a predetermined wait time is provided in between the processing related to the first application program that is in inactive state, until the predetermined time period is timed out by the timing unit.

10. The information processing apparatus according to claim 9, wherein:
the first application program is an application program related to thumbnail display;
the information processing apparatus further comprises;
a decoding unit configured to decode still image data or moving image data in a predetermined decoding method, upon execution of the first application program, and
a generating unit configured to generate thumbnail image data related to a still image or a moving image, on the basis of an image signal related to a still image or an image signal related to a moving image which is decoded by the decoding unit, upon execution of the first application program; and
the control unit controls so as to provide the predetermined wait time in between each generating process by the generating unit.

11. The information processing apparatus according to claim 10, wherein the predetermined wait time is provided after generation of a single piece of the thumbnail image data is finished.

12. The information processing apparatus according to claim 10, wherein the predetermined wait time is provided during generation of the thumbnail image data.

13. The information processing apparatus according to claim 12, wherein the predetermined wait time is set based on a number of macroblocks included in the thumbnail image data.

14. The information processing apparatus according to claim 9, wherein if it is further determined before the predetermined time period is timed out that an input made with respect to the application program that is in active state, the timing unit resets the predetermined time period to be timed, and starts timing of the reset predetermined time period.

15. The information processing apparatus according to claim 1, wherein the event notified to each application program by the event notifying unit is an event related to dummy input issued by the application program that is in inactive state.

* * * * *

UNITED STATES PATENT AND TRADEMARK OFFICE
CERTIFICATE OF CORRECTION

PATENT NO. : 8,539,503 B2
APPLICATION NO. : 12/409719
DATED : September 17, 2013
INVENTOR(S) : Akitsugu Homma Page 1 of 1

It is certified that error appears in the above-identified patent and that said Letters Patent is hereby corrected as shown below:

On the Title Page, in Item (75), under "Inventor", in Column 1, Line 1, delete "Akitugu Homma," and insert -- Akitsugu Homma, --, therefor.

Signed and Sealed this
First Day of April, 2014

Michelle K. Lee
*Deputy Director of the United States Patent and Trademark Office*